(12) United States Patent
Mao et al.

(10) Patent No.: US 7,803,050 B2
(45) Date of Patent: *Sep. 28, 2010

(54) TRACKING DEVICE WITH SOUND EMITTER FOR USE IN OBTAINING INFORMATION FOR CONTROLLING GAME PROGRAM EXECUTION

(75) Inventors: Xiadong Mao, Foster City, CA (US); Richard L. Marks, Foster City, CA (US); Gary M. Zalewski, Oakland, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1147 days.

This patent is subject to a terminal disclaimer.

(21) Appl. No.: 11/382,256

(22) Filed: May 8, 2006

(65) Prior Publication Data

US 2006/0274911 A1 Dec. 7, 2006

Related U.S. Application Data

(63) Continuation-in-part of application No. 10/207,677, filed on Jul. 27, 2002, now Pat. No. 7,102,615, and a continuation-in-part of application No. 10/650,409, filed on Aug. 27, 2003, now Pat. No. 7,613,310, and a continuation-in-part of application No. 10/663,236, filed on Sep. 15, 2003, and a continuation-in-part of application No. 10/759,782, filed on Jan. 16, 2004, and a continuation-in-part of application No. 10/820,469, filed on Apr. 7, 2004, and a continuation-in-part of (Continued)

(60) Provisional application No. 60/718,145, filed on Sep. 15, 2005, provisional application No. 60/798,031, filed on May 6, 2006.

(51) Int. Cl.
*A63F 9/24* (2006.01)
*A63F 13/00* (2006.01)
*H04R 3/00* (2006.01)
*H04R 1/02* (2006.01)

(52) U.S. Cl. ............................. 463/36; 381/91; 381/92; 381/111; 381/122; 463/37

(58) Field of Classification Search ................... 463/36; 381/91, 92, 111, 122
See application file for complete search history.

(56) References Cited

U.S. PATENT DOCUMENTS 4,624,012 A 11/1986 Lin et al.
4,963,858 A 10/1990 Chien ........................ 345/157

(Continued)

FOREIGN PATENT DOCUMENTS

EP 0353200 A2 1/1990

(Continued)

OTHER PUBLICATIONS

Mark Fiala et al., "A Panoramic Video and Acoustic Beamforming Sensor for Videoconferencing", IEEE, Oct. 2-3, 2004, pp. 47-52.

(Continued)

*Primary Examiner*—John M Hotaling
*Assistant Examiner*—Marcus D Jones
(74) *Attorney, Agent, or Firm*—Joshua D. Isenberg; JDI Patent

(57) ABSTRACT

A tracking device for use in obtaining information for controlling an execution of a game program by a processor for enabling an interactive game to be played by a user and related apparatus are disclosed.

13 Claims, 8 Drawing Sheets

Related U.S. Application Data application No. 11/301,673, filed on Dec. 12, 2005, now Pat. No. 7,646,372, and a continuation-in-part of application No. 11/381,729, filed on May 4, 2006, and a continuation-in-part of application No. 11/381,728, filed on May 4, 2006, now Pat. No. 7,545,926, and a continuation-in-part of application No. 11/381,725, filed on May 4, 2006, and a continuation-in-part of application No. 11/381,727, filed on May 4, 2006, now Pat. No. 7,697,700, and a continuation-in-part of application No. 11/381,724, filed on May 4, 2006, and a continuation-in-part of application No. 11/381,721, filed on May 4, 2006, and a continuation-in-part of application No. 11/418,988, filed on May 4, 2006, and a continuation-in-part of application No. 11/418,989, filed on May 4, 2006, and a continuation-in-part of application No. 11/429,047, filed on May 4, 2006, and a continuation-in-part of application No. 11/429,133, filed on May 4, 2006, and a continuation-in-part of application No. 11/429,414, filed on May 4, 2006, and a continuation-in-part of application No. 11/382,013, filed on May 6, 2006, and a continuation-in-part of application No. 11/382,032, filed on May 6, 2006, and a continuation-in-part of application No. 11/382,033, filed on May 6, 2006, and a continuation-in-part of application No. 11/382,035, filed on May 6, 2006, and a continuation-in-part of application No. 11/382,036, filed on May 6, 2006, and a continuation-in-part of application No. 11/382,041, filed on May 7, 2006, now Pat. No. 7,352,359, and a continuation-in-part of application No. 11/382,038, filed on May 6, 2006, now Pat. No. 7,352,358, and a continuation-in-part of application No. 11/382,040, filed on May 7, 2006, now Pat. No. 7,391,409, and a continuation-in-part of application No. 11/382,034, filed on May 6, 2006, and a continuation-in-part of application No. 11/382,037, filed on May 6, 2006, and a continuation-in-part of application No. 11/382,043, filed on May 7, 2006, and a continuation-in-part of application No. 11/382,039, filed on May 7, 2006, and a continuation-in-part of application No. 29/259,349, filed on May 6, 2006, and a continuation-in-part of application No. 29/259,350, filed on May 6, 2006, and a continuation-in-part of application No. 29/259,348, filed on May 6, 2006.

(56) References Cited

U.S. PATENT DOCUMENTS

| | | | | |
|---|---|---|---|---|
| 5,018,736 | A | 5/1991 | Pearson et al. | 463/29 |
| 5,113,449 | A | 5/1992 | Blanton et al. | |
| 5,128,671 | A | 7/1992 | Thomas, Jr. | 341/20 |
| 5,214,615 | A * | 5/1993 | Bauer | 367/128 |
| 5,227,985 | A | 7/1993 | DeMenthon | 702/153 |
| 5,262,777 | A | 11/1993 | Low et al. | 341/20 |
| 5,296,871 | A | 3/1994 | Paley | 345/163 |
| 5,327,521 | A | 7/1994 | Savic et al. | |
| 5,335,011 | A | 8/1994 | Addeo et al. | 348/15 |
| 5,394,168 | A | 2/1995 | Smith, III et al. | 345/156 |
| 5,425,130 | A | 6/1995 | Morgan | |
| 5,453,758 | A | 9/1995 | Sato | 345/158 |
| 5,485,273 | A | 1/1996 | Mark et al. | 356/467 |
| 5,534,917 | A | 7/1996 | MacDougall | 348/169 |
| 5,554,980 | A | 9/1996 | Hashimoto et al. | 340/825.72 |
| 5,563,988 | A | 10/1996 | Maes et al. | 345/421 |
| 5,611,731 | A | 3/1997 | Bouton et al. | 463/37 |
| 5,649,021 | A | 7/1997 | Matey et al. | 382/128 |
| 5,694,474 | A | 12/1997 | Ngo et al. | |
| 5,768,415 | A | 6/1998 | Jagadish et al. | 382/154 |
| 5,850,222 | A | 12/1998 | Cone | 345/418 |
| 5,900,863 | A | 5/1999 | Numazaki | 345/158 |
| 5,913,727 | A | 6/1999 | Ahdoot | 463/39 |
| 5,916,024 | A | 6/1999 | Von Kohorn | 463/40 |
| 5,917,936 | A | 6/1999 | Katto | 382/154 |
| 5,930,383 | A | 7/1999 | Netzer | 382/154 |
| 5,991,693 | A | 11/1999 | Zalewski | |
| 5,993,314 | A | 11/1999 | Dannenburg et al. | |
| 6,002,776 | A | 12/1999 | Bhadkamkar et al. | |
| 6,009,210 | A | 12/1999 | Kang | 382/276 |
| 6,009,396 | A | 12/1999 | Nagata | |
| 6,014,167 | A | 1/2000 | Suito et al. | 348/169 |
| 6,014,623 | A | 1/2000 | Wu et al. | |
| 6,022,274 | A | 2/2000 | Takeda et al. | 463/44 |
| 6,057,909 | A | 5/2000 | Yahav et al. | 356/5.04 |
| 6,061,055 | A | 5/2000 | Marks | 382/276 |
| 6,069,594 | A | 5/2000 | Barnes et al. | 345/7 |
| 6,075,895 | A | 6/2000 | Qiao et al. | 382/218 |
| 6,081,780 | A | 6/2000 | Lumelsky | |
| 6,100,895 | A | 8/2000 | Miura et al. | 345/426 |
| 6,115,684 | A | 9/2000 | Kawahara et al. | |
| 6,173,059 | B1 | 1/2001 | Huang et al. | 381/92 |
| 6,195,104 | B1 | 2/2001 | Lyons | 345/473 |
| 6,243,491 | B1 | 6/2001 | Andersson | 382/165 |
| 6,304,267 | B1 | 10/2001 | Sata | 345/427 |
| 6,317,703 | B1 | 11/2001 | Linsker | |
| 6,332,028 | B1 | 12/2001 | Marash | |
| 6,336,092 | B1 | 1/2002 | Gibson et al. | |
| 6,339,758 | B1 | 1/2002 | Kanazawa et al. | |
| 6,346,929 | B1 | 2/2002 | Fukushima et al. | 345/8 |
| 6,371,849 | B1 | 4/2002 | Togami | 463/4 |
| 6,392,644 | B1 | 5/2002 | Miyata et al. | 345/419 |
| 6,394,897 | B1 | 5/2002 | Togami | 463/4 |
| 6,400,374 | B2 | 6/2002 | Lanier | 345/630 |
| 6,411,744 | B1 | 6/2002 | Edwards | 382/294 |
| 6,417,836 | B1 | 7/2002 | Kumar et al. | 345/156 |
| 6,441,825 | B1 | 8/2002 | Peters | 345/473 |
| 6,489,948 | B1 | 12/2002 | Lau | 345/163 |
| 6,545,706 | B1 | 4/2003 | Edwards et al. | 348/169 |
| 6,573,883 | B1 | 6/2003 | Bartlett | 345/156 |
| 6,597,342 | B1 | 7/2003 | Haruta | 345/157 |
| 6,618,073 | B1 | 9/2003 | Lambert et al. | |
| 6,699,123 | B2 | 3/2004 | Matsuura et al. | 463/31 |
| 6,720,949 | B1 | 4/2004 | Pryor et al. | 345/158 |
| 6,791,531 | B1 | 9/2004 | Johnston et al. | 345/157 |
| 6,890,262 | B2 | 5/2005 | Oishi et al. | 463/31 |
| 6,931,362 | B2 | 8/2005 | Beadle et al. | |
| 6,934,397 | B2 | 8/2005 | Madievski et al. | |
| 6,990,639 | B2 | 1/2006 | Wilson | 715/863 |
| 7,035,415 | B2 | 4/2006 | Belt et al. | |
| 7,042,440 | B2 | 5/2006 | Pryor et al. | 345/158 |
| 7,088,831 | B2 | 8/2006 | Rosca et al. | |
| 7,092,882 | B2 | 8/2006 | Arrowood et al. | |
| 7,102,615 | B2 | 9/2006 | Marks | 345/156 |
| 7,212,956 | B2 | 5/2007 | Bruno et al. | |
| 7,227,976 | B1 | 6/2007 | Jung et al. | 382/103 |
| 7,233,316 | B2 | 6/2007 | Smith et al. | 345/157 |
| 7,280,964 | B2 | 10/2007 | Wilson et al. | |
| D571,367 | S | 6/2008 | Goto et al. | D14/401 |
| D571,806 | S | 6/2008 | Goto | D14/401 |
| 7,386,135 | B2 | 6/2008 | Fan | |
| D572,254 | S | 7/2008 | Goto | D14/401 |
| 2002/0024500 | A1 | 2/2002 | Haward | 345/158 |
| 2002/0041327 | A1 | 4/2002 | Hildreth et al. | 348/42 |
| 2002/0048376 | A1 | 4/2002 | Ukita | |
| 2002/0051119 | A1 | 5/2002 | Sherman et al. | |
| 2002/0109680 | A1 | 8/2002 | Orbanes et al. | |
| 2002/0110273 | A1 | 8/2002 | Dufour | 382/154 |
| 2003/0020718 | A1 | 1/2003 | Marshall et al. | 345/474 |
| 2003/0022716 | A1 | 1/2003 | Park et al. | 463/36 |
| 2003/0031333 | A1 | 2/2003 | Cohen et al. | |
| 2003/0032466 | A1 | 2/2003 | Watashiba | 463/2 |

| | | |
|---|---|---|
| 2003/0032484 A1 | 2/2003 | Ohshima et al. ............... 463/43 |
| 2003/0046038 A1 | 3/2003 | Deligne et al. |
| 2003/0055646 A1 | 3/2003 | Yoshioka et al. |
| 2003/0063065 A1 | 4/2003 | Lee et al. ..................... 345/156 |
| 2003/0100363 A1 | 5/2003 | Ali ............................... 463/30 |
| 2003/0160862 A1 | 8/2003 | Charlier et al. ........... 348/14.08 |
| 2003/0193572 A1 | 10/2003 | Wilson et al. ........... 348/207.99 |
| 2004/0029640 A1 | 2/2004 | Masuyama et al. ............. 463/43 |
| 2004/0046736 A1 | 3/2004 | Pryor et al. .................. 345/156 |
| 2004/0047464 A1 | 3/2004 | Yu et al. .................. 379/392.01 |
| 2004/0063502 A1 | 4/2004 | Hussaini ....................... 463/56 |
| 2004/0070564 A1 | 4/2004 | Dawson et al. .............. 345/156 |
| 2004/0075677 A1 | 4/2004 | Loyall et al. |
| 2004/0155962 A1 | 8/2004 | Marks ......................... 348/469 |
| 2004/0178576 A1 | 9/2004 | Hillis et al. .............. 273/148 B |
| 2004/0207597 A1 | 10/2004 | Marks ......................... 345/156 |
| 2004/0213419 A1 | 10/2004 | Varma et al. ................... 381/92 |
| 2004/0239670 A1 | 12/2004 | Marks ......................... 345/419 |
| 2004/0240542 A1 | 12/2004 | Yeredor et al. ......... 375/240.01 |
| 2005/0047611 A1 | 3/2005 | Mao ........................... 381/94.7 |
| 2005/0059488 A1 | 3/2005 | Larsen et al. ................. 463/36 |
| 2005/0114126 A1 | 5/2005 | Geiger et al. |
| 2005/0115383 A1 | 6/2005 | Chang |
| 2005/0162384 A1 | 7/2005 | Yokoyama .................. 345/156 |
| 2005/0174324 A1 | 8/2005 | Liberty et al. ............... 345/156 |
| 2005/0226431 A1 | 10/2005 | Mao ............................... 381/61 |
| 2005/0282603 A1 | 12/2005 | Parrott et al. ................... 463/1 |
| 2006/0035710 A1 | 2/2006 | Festejo et al. ................. 463/36 |
| 2006/0115103 A1 | 6/2006 | Feng et al. |
| 2006/0121681 A1 | 6/2006 | Nandakumar |
| 2006/0136213 A1 | 6/2006 | Hirose et al. |
| 2006/0139322 A1 | 6/2006 | Marks |
| 2006/0204012 A1 | 9/2006 | Marks ......................... 382/26 |
| 2006/0233389 A1 | 10/2006 | Mao et al. ..................... 381/92 |
| 2006/0239471 A1 | 10/2006 | Mao et al. ..................... 381/92 |
| 2006/0252474 A1 | 11/2006 | Zalewski et al. ............... 463/1 |
| 2006/0252475 A1 | 11/2006 | Zalewski et al. ............... 463/1 |
| 2006/0252477 A1 | 11/2006 | Zalewski et al. ............... 463/7 |
| 2006/0252541 A1 | 11/2006 | Zalewski et al. ............. 463/36 |
| 2006/0252543 A1 | 11/2006 | Van Noland et al. .......... 463/37 |
| 2006/0256081 A1 | 11/2006 | Zalewski et al. ............. 345/156 |
| 2006/0264258 A1 | 11/2006 | Zalewski et al. ............. 463/36 |
| 2006/0264259 A1 | 11/2006 | Zalewski et al. ............. 463/36 |
| 2006/0264260 A1 | 11/2006 | Zalewski et al. ............. 463/36 |
| 2006/0269072 A1 | 11/2006 | Mao ............................. 381/56 |
| 2006/0269073 A1 | 11/2006 | Mao ............................. 381/56 |
| 2006/0274032 A1 | 12/2006 | Mao et al. ................... 345/156 |
| 2006/0274911 A1 | 12/2006 | Mao et al. ................... 380/334 |
| 2006/0277571 A1 | 12/2006 | Marks ......................... 725/37 |
| 2006/0280312 A1 | 12/2006 | Mao ............................. 381/56 |
| 2006/0282873 A1 | 12/2006 | Zalewski et al. ............. 725/133 |
| 2006/0287084 A1 | 12/2006 | Mao et al. ..................... 463/37 |
| 2006/0287085 A1 | 12/2006 | Mao et al. ..................... 463/37 |
| 2006/0287086 A1 | 12/2006 | Zalewski et al. ............. 463/37 |
| 2006/0287087 A1 | 12/2006 | Zalewski et al. ............. 463/37 |
| 2007/0015558 A1 | 1/2007 | Zalewski et al. ............... 463/1 |
| 2007/0015559 A1 | 1/2007 | Zalewski et al. ............... 463/1 |
| 2007/0021208 A1 | 1/2007 | Mao et al. ..................... 436/36 |
| 2007/0025562 A1 | 2/2007 | Zalewski et al. ............... 381/92 |
| 2007/0027687 A1 | 2/2007 | Turk et al. |
| 2007/0060350 A1 | 3/2007 | Osman |
| 2007/0061413 A1 | 3/2007 | Larsen ......................... 704/247 |
| 2007/0120834 A1 | 5/2007 | Boillot ......................... 345/173 |
| 2007/0120996 A1 | 5/2007 | Boillot ......................... 348/345 |
| 2007/0213987 A1 | 9/2007 | Turk et al. |
| 2007/0223732 A1 | 9/2007 | Mao |
| 2007/0233489 A1 | 10/2007 | Hirose et al. |
| 2007/0258599 A1 | 11/2007 | Mao ............................ 381/71.1 |
| 2007/0260340 A1 | 11/2007 | Mao ............................. 700/94 |
| 2007/0260517 A1 | 11/2007 | Zalewski et al. ............... 705/14 |
| 2007/0261077 A1 | 11/2007 | Zalewski et al. ............... 725/35 |
| 2007/0265075 A1 | 11/2007 | Zalewski |
| 2007/0274535 A1 | 11/2007 | Mao ........................... 381/94.1 |
| 2007/0298882 A1 | 12/2007 | Marks et al. ................... 463/36 |
| 2008/0056561 A1 | 3/2008 | Sawachi ..................... 382/154 |
| 2008/0070684 A1 | 3/2008 | Haigh-Hutchinson ........ 463/32 |
| 2008/0096654 A1 | 4/2008 | Mondesir |
| 2008/0096657 A1 | 4/2008 | Benoist |
| 2008/0098448 A1 | 4/2008 | Mondesir |
| 2008/0100825 A1 | 5/2008 | Zalewski |
| 2008/0120115 A1 | 5/2008 | Mao |
| 2009/0062943 A1 | 3/2009 | Nason et al. |

FOREIGN PATENT DOCUMENTS

| | | |
|---|---|---|
| EP | 0613294 A1 | 8/1994 |
| EP | 0 652 686 | 5/1995 |
| EP | 0750202 A1 | 12/1996 |
| EP | 0823 683 A1 | 2/1998 |
| EP | 0 835 676 | 4/1998 |
| EP | 0 867 798 | 9/1998 |
| EP | 0869 458 A2 | 10/1998 |
| EP | 1 033 882 | 9/2000 |
| EP | 1 074 934 | 2/2001 |
| EP | 1180 384 A2 | 2/2002 |
| EP | 1279 425 A2 | 1/2003 |
| EP | 1 335 338 | 8/2003 |
| EP | 1 358 918 | 11/2003 |
| EP | 1 411 461 | 4/2004 |
| EP | 1 489 596 | 12/2004 |
| FR | 2 780 176 | 6/1998 |
| FR | 2832 892 | 5/2003 |
| GB | 2 376 397 A | 12/2002 |
| JP | 03288898 | 12/1991 |
| WO | WO 88/05942 | 8/1988 |
| WO | WO 99/26198 | 5/1999 |
| WO | WO 01/18563 A1 | 3/2001 |
| WO | WO 2004/073814 | 9/2004 |
| WO | WO 2004/073815 | 9/2004 |
| WO | 2006/121681 | 11/2006 |
| WO | WO 2006/121896 | 11/2006 |

OTHER PUBLICATIONS

Kevin W. Wilson et al., "Audio-Video Array Source Localization for Intelligent Environments", IEEE 2002, vol. 2, pp. 2109-2112.

U.S. Appl. No. 29/259,350, entitled, "Controller With Traking Sensors," to Gary Zalewski, filed May 6, 2006.

U.S. Appl. No. 29/259,348, entitled, "Tracked Controller Device," to Gary Zalewski, filed May 6, 2006.

U.S. Appl. No. 60/798,031 entitled, "Dynamic Target Interface," to Bruce Woodard, filed May 6, 2006.

U.S. Appl. No. 29/259,349 entitled, "Controller With Infared Port," to Teiyu Goto, filed May 6, 2006.

U.S. Appl. No. 29/246,744, entitled "Video Game Contoller Front Face," to Teiyu Goto, filed May 8, 2006.

U.S. Appl. No. 29/246,763, entitled "Ergonomic Game Controller Device With LEDS and Optical Ports" filed May 8, 2006.

U.S. Appl. No. 29/246,759, entitled "Game Controller Device With LEDS and Optical Ports" filed May 8, 2006.

U.S. Appl. No. 29/246,765, entitled "Design for Optical Game Controller Interface" filed May 8, 2006.

U.S. Appl. No. 29/246,766, entitled "Dual Grip Game Control Device With LEDS and Optical Ports" filed May 8, 2006.

U.S. Appl. No. 29/246,764, entitled "Game Interface Device With LEDS and Optical Ports" filed May 8, 2006.

U.S. Appl. No. 29/246,762, entitled "Ergonomic Game Interface Device With LEDS and Optical Ports" filed May 8, 2006.

Definition of "mount"—Merriam-Webster Online Dictionary; downloaded from the Internet <http://www.m-w.com/dictionary/mountable, downloaded on Nov. 8, 2007.

CFS and FS95/98/2000: How to Use the Trim Controls to Keep Your Aircraft level—http://support.microsoft.com/?scid=kb%3Ben-us%3B175195&x=13&y=15, downloaded on Aug. 10, 2007.

Klinker et al., "Distribute User Tracking Concepets for Augmented Reality Applications" pp. 37-44, Augmented Reality, 2000, IEEE and ACM Int'l Symposium, Oct. 2000, XP010520308, ISBN: 0-7695-0846-4, Germany.

Iddan et al. "3D Imaging in the Studio (and Elswhere . . . )", Proceedings of the SPIE, SPIE, Bellingham, VA, US, vol. 4298, Jan. 24, 2001, pp. 48-55, XP008005351.

Jojie et al., Tracking self-occluding Articulated Objects in Dense Disparity Maps, Computer Vision, 1999. The Proceedings of the seventh IEEE International Conference on Kerkyra, Greece Sep. 20-27, 1999, Los Alamitos, CA, USA, IEEE Comput. Soc, Us, Sep. 20, 1999, pp. 123-130.

"The Tracking Cube: A Three Dimensional Input Device", IBM Technical Disclosure Bulletin, Aug. 1, 1989, pp. 91-95, vol. 32, No. 3b, IBM Corp. new York, US.

Jaron Lanier, "Virtually There", Scientific American: New Horizons for Information Technology,2003.

Y. Ephraim and D. Malah, "Speech Enhancement Using a Minimum Mean-square Error Log- Spectral Amplitude Estimator," IEEE Trans. Acoust., Speech, Signal Processing, vol. ASSP-33, pp. 443-445, Apr. 1985.

International Search Report and Written Opinion for International Application No. PCT/US06/61056 dated Mar. 3, 2008, 8 pages.

International Search Report and Written Opinion of the International Searching Authority for International Patent Application No. PCT/US07/67004 dated Jul. 28, 2008, 7 pages.

Office Action dated Jul. 25, 2008 for U.S. Appl. No. 11/382,035.

International Search Report and Written Opinion for International Application No. PCT/US07/67010 dated Oct. 3, 2008, 11 pages.

International Search Report and Written Opinion for International Application No. PCT/US07/67005 dated Jun. 18, 2008, 7 pages.

International Search Report and Written Opinion for International Application No. PCT/US07/67324 dated Oct. 3, 2008, 7 pages.

International Search Report and Written Opinion for International Application No. PCT/US07/67961 dated Sep. 16, 2008, 6 pages.

International Search Report and Written Opinion for International Application No. PCT/US07/67437 dated Jun. 3, 2008, 3 pages.

International Search Report and Written Opinion for International Application No. PCT/US07/67697 dated Sep. 15, 2008, 4 pages.

Office Action dated Jul. 22, 2008 for U.S. Appl. No. 11/382,250, 11 pages.

Office Action dated Aug. 8, 2007 for U.S. Appl. No. 11/382,252 , 9 pages.

Final Office Action dated Jan. 17, 2008 for U.S. Appl. No. 11/382,252, 8 pages.

Office Action dated May 13, 2008 for U.S. Appl. No. 11/382,252, 10 pages.

Final Office Action dated Nov. 26, 2008 for U.S. Appl. No. 11/382,252, 12 pages.

Final Office Action dated Jan. 7, 2009 for U.S. Appl. No. 11/382,035, 15 pages.

Final Office Action issued in U.S. Appl. No. 11/418,989 mailed Jan. 27, 2009, 8 pages.

Office Action issued in U.S. Appl. No. 11/429,047 mailed Aug. 20, 2009, 9 pages.

Office Action issued on U.S. Appl. No. 11/600,938 mailed Nov. 5, 2009, 17 pages.

Final Office Action issued in U.S. Appl. No. 11/717,269 mailed Aug. 19, 2009, 9 pages.

Office Action issued in U.S. Appl. No. 11/418,988 mailed Sep. 21, 2009.

Advisory Action issued in U.S. Appl. No. 11/418,989 mailed Jun. 4, 2009, 3 pages.

Office Action issued in U.S. Appl. No. 11/418,989 mailed Jun. 12, 2009, 8 pages.

Office Action issued in U.S. Appl. No. 11/429,047 mailed Jan. 23, 2009, 10 pages.

Office Action issued in U.S. Appl. No. 11/717,269 mailed Feb. 10, 2009, 8 pages.

Advisory Action issued in U.S. Appl. No. 11/418,988 mailed Jul. 1, 2009.

Final Office Action issued in U.S. Appl. No. 11/418,988 mailed Feb. 23, 2009.

Office Action issued in U.S. Appl. No. 11/418,989 mailed Aug. 6, 2008, 9 pages.

Office Action issued in U.S. Appl. No. 11/429,047 mailed Aug. 6, 2008, 9 pages.

Office Action issued in U.S. Appl. No. 11/418,988 mailed Aug. 26, 2008.

U.S. Appl. No. 60/789,031, filed May 6, 2006.

U.S. Appl. No. 60/718,145, filed Sep. 15, 2005.

U.S. Appl. No. 60/678,413, filed May 5, 2005.

Patent Cooperation Treaty: "International Search Report" for PCT Application No. PCT/US2006/016670, which corresponds to U.S. Pub. No. 2006-0206012; mailed Aug. 30, 2006; 2 Pages.

Patent Cooperation Treaty: "Written Opinion of the International Searching Authority" for PCT Application No. PCT/US2006/016670, which corresponds to U.S. Pub. No. 2006-0204012; mailed Aug. 30, 2006; 4 Pages.

Notice of Allowance issued in U.S. Appl. No. 11/381,725 mailed Dec. 18, 2009.

Notice of Allowance issued in U.S. Appl. No. 11/381,729 mailed Jan. 19, 2010.

Notice of Allowance issued in U.S. Appl. No. 11/381,724 mailed Feb. 5, 2010.

Office Action issued in U.S. Appl. No. 11/418,989 mailed Jan. 5, 2010.

Non-final Office Action dated Sep. 29, 2008 for U.S. Appl. No. 11/381,729.

Non-final Office Action dated Mar. 13, 2009 for U.S. Appl. No. 11/381,729.

Final Office Action dated Sep. 17, 2009 for U.S. Appl. No. 11/381,729.

Non-final Office Action dated Aug. 19, 2008 for U.S. Appl. No. 11/381,725.

Non-final Office Action dated Feb. 18, 2009 for U.S. Appl. No. 11/381,725.

Final Office Action dated Aug. 20, 2009 for U.S. Appl. No. 11/381,725.

Non-final Office Action dated Aug. 20, 2008 for U.S. Appl. No. 11/381,724.

Non-final Office Action dated Feb. 24, 2009 for U.S. Appl. No. 11/381,724.

Non-final Office Action dated Aug. 19, 2009 for U.S. Appl. No. 11/381,724.

J. Benesty, "Adaptive Eigenvalue Decomposition Algorithm for Passive Acoustic Source Localization." J. Acoust. Soc. Amer., vol. 107, No. 1, pp. 384-391, Jan. 2000.

Notice of Allowance and Fee(s) Due dated May 27, 2010 issued for U.S. Appl. No. 11/381,729.

Notice of Allowance and Fee(s) Due dated Apr. 2, 2010 issued for U.S. Appl. No. 11/381,725.

US 2002/0018582 A1, 02/2002, Hagiwara et al. (withdrawn)

* cited by examiner

FIG. 1C
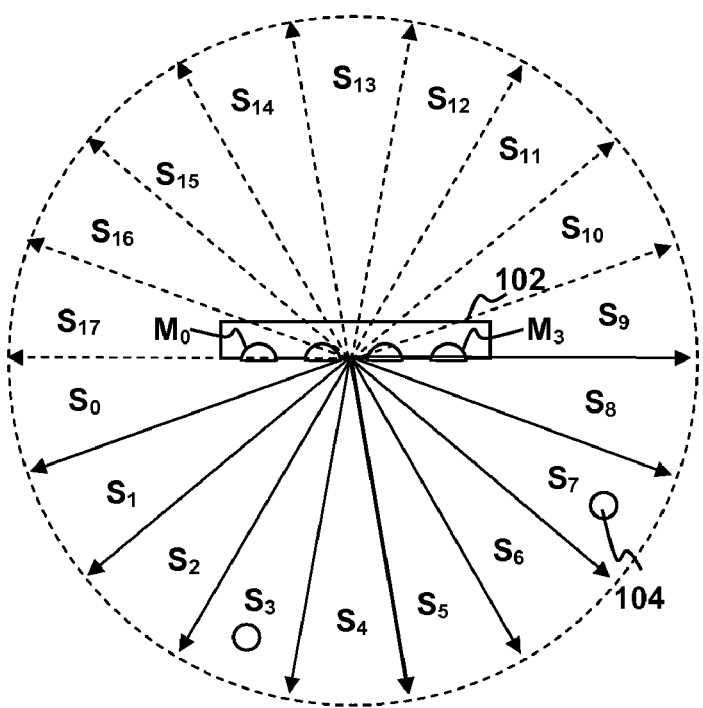
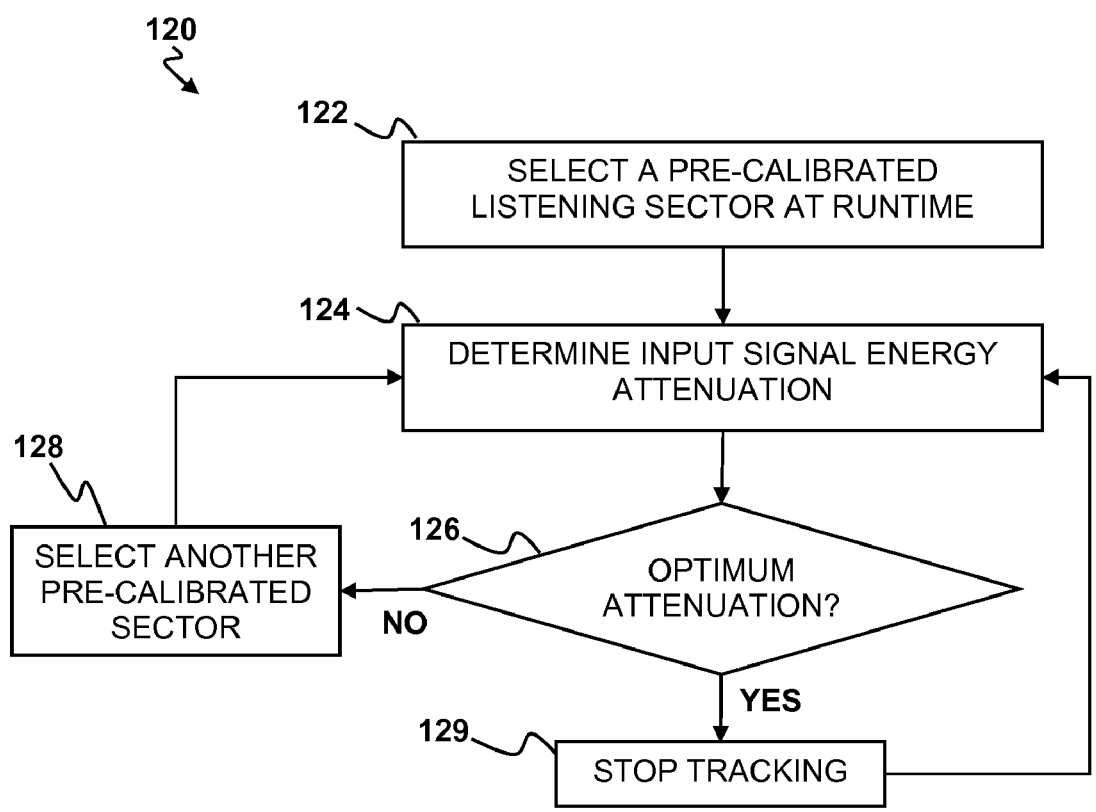
FIG. 1D

TRACKING DEVICE WITH SOUND EMITTER FOR USE IN OBTAINING INFORMATION FOR CONTROLLING GAME PROGRAM EXECUTION

PRIORITY CLAIM

This application also claims benefit of U.S. Provisional Patent Application No. 60/718,145, entitled "AUDIO, VIDEO, SIMULATION, AND USER INTERFACE PARADIGMS", filed Sep. 15, 2005, which is hereby incorporated by reference.

This application is a continuation in part (CIP) of U.S. patent application Ser. No. 10/207,677, entitled, "MAN-MACHINE INTERFACE USING A DEFORMABLE DEVICE", filed on Jul. 27, 2002 now U.S. Pat. No. 7,107,615; U.S. patent application Ser. No. 10/650,409, entitled, "AUDIO INPUT SYSTEM", filed on Aug. 27, 2003 now U.S. Pat. No. 7,613,310; U.S. patent application Ser. No. 10/663,236, entitled "METHOD AND APPARATUS FOR ADJUSTING A VIEW OF A SCENE BEING DISPLAYED ACCORDING TO TRACKED HEAD MOTION", filed on Sep. 15, 2003; U.S. patent application Ser. No. 10/759,782, entitled "METHOD AND APPARATUS FOR LIGHT INPUT DEVICE", filed on Jan. 16, 2004; U.S. patent application Ser. No. 10/820,469, entitled "METHOD AND APPARATUS TO DETECT AND REMOVE AUDIO DISTURBANCES", filed on Apr. 7, 2004; and U.S. patent application Ser. No. 11/301,673, entitled "METHOD FOR USING RELATIVE HEAD AND HAND POSITIONS TO ENABLE A POINTING INTERFACE VIA CAMERA TRACKING", filed on Dec. 12, 2005 now U.S. Pat. No. 7,646,372, all of which are hereby incorporated by reference.

This application is also a continuation in part (CIP) of U.S. patent application Ser. No. 11/381,729, to Xiao Dong Mao, entitled ULTRA SMALL MICROPHONE ARRAY, filed on May 4, 2006, application Ser. No. 11/381,728, to Xiao Dong Mao, entitled ECHO AND NOISE CANCELLATION, filed on May 4, 2006 now U.S. Pat. No. 7,545,926, U.S. patent application Ser. No. 11/381,725, to Xiao Dong Mao, entitled "METHODS AND APPARATUS FOR TARGETED SOUND DETECTION", filed on May 4, 2006, U.S. patent application Ser. No. 11/381,727, to Xiao Dong Mao, entitled "NOISE REMOVAL FOR ELECTRONIC DEVICE WITH FAR FIELD MICROPHONE ON CONSOLE", filed on May 4, 2006 now U.S. Pat. No. 7,697,700, U.S. patent application Ser. No. 11/381,724, to Xiao Dong Mao, entitled "METHODS AND APPARATUS FOR TARGETED SOUND DETECTION AND CHARACTERIZATION", filed on May 4, 2006, U.S. patent application Ser. No. 11/381,721, to Xiao Dong Mao, entitled "SELECTIVE SOUND SOURCE LISTENING IN CONJUNCTION WITH COMPUTER INTERACTIVE PROCESSING", filed on May 4, 2006; all of which are hereby incorporated by reference.

This application is also a continuation in part (CIP) of: application Ser. No. 11/418,988, to Xiao Dong Mao, entitled "METHODS AND APPARATUSES FOR ADJUSTING A LISTENING AREA FOR CAPTURING SOUNDS", filed on May 4, 2006; co-pending application Ser. No. 11/418,989, to Xiao Dong Mao, entitled "METHODS AND APPARATUSES FOR CAPTURING AN AUDIO SIGNAL BASED ON VISUAL IMAGE", filed on May 4, 2006; co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed on May 4, 2006; co-pending application Ser. No. 11/429,133, to Richard Marks et al., entitled "SELECTIVE SOUND SOURCE LISTENING IN CONJUNCTION WITH COMPUTER INTERACTIVE PROCESSING", filed on May 4, 2006; and co-pending application Ser. No. 11/429,414, to Richard Marks et al., entitled "Computer Image and Audio Processing of Intensity and Input Devices for Interfacing With A Computer Program", filed on May 4, 2006, all of the entire disclosures of which are incorporated herein by reference.

This application is also a continuation in part (CIP) of U.S. patent application Ser. No. 11/382,031, entitled "MULTI-INPUT GAME CONTROL MIXER", filed on May 6, 2006; U.S. patent application Ser. No. 11/382,032, entitled "SYSTEM FOR TRACKING USER MANIPULATIONS WITHIN AN ENVIRONMENT", filed on May 6, 2006; U.S. patent application Ser. No. 11/382,033, entitled "SYSTEM, METHOD, AND APPARATUS FOR THREE-DIMENSIONAL INPUT CONTROL", filed on May 6, 2006; U.S. patent application Ser. No. 11/382,035, entitled "INERTIALLY TRACKABLE HAND-HELD CONTROLLER", filed on May 6, 2006; U.S. patent application Ser. No. 11/382,036, entitled "METHOD AND SYSTEM FOR APPLYING GEARING EFFECTS TO VISUAL TRACKING", filed on May 6, 2006; U.S. ptent application Ser. No. 11/382,041, entitled "METHOD AND SYSTEM FOR APPLYING GEARING EFFECTS TO INERTIAL TRACKING", filed on May 7, 2006 now U.S. Pat. No. 7,352,359; U.S. patent application Ser. No. 11/382,038, entitled "METHOD AND SYSTEM FOR APPLYING GEARING EFFECTS TO ACOUSTICAL TRACKING", filed on May 6, 2006 now U.S. Pat. No. 7,352,358; U.S. patent application Ser. No. 11/382,040, entitled "METHOD AND SYSTEM FOR APPLYING GEARING EFFECTS TO MULTI-CHANNEL MIXED INPUT", filed on May 7, 2006 now U.S. Pat. No. 7,391,409; U.S. patent application Ser. No. 11/382,034, entitled "SCHEME FOR DETECTING AND TRACKING USER MANIPULATION OF A GAME CONTROLLER BODY", filed on May 6, 2006; U.S. patent application Ser No. 11/382,037, entitled "SCHEME FOR TRANSLATING MOVEMENTS OF A HAND-HELD CONTROLLER INTO INPUTS FOR A SYSTEM", filed on May 6, 2006; U.S. patent application Ser. No. 11/382,043, entitled "DETECTABLE AND TRACKABLE HAND-HELD CONTROLLER", filed on May 7, 2006; U.S. patent application Ser. No. 11/382,039, entitled "METHOD FOR MAPPING MOVEMENTS OF A HAND-HELD CONTROLLER TO GAME COMMANDS", filed on May 7, 2006; U.S. Design Patent Application Ser. No. 29/259,349, entitled "CONTROLLER WITH INFRARED PORT", filed on May 6, 2006; U.S. Design Patent Application Ser. No. 29/259,350, entitled "CONTROLLER WITH TRACKING SENSORS", filed on May 6, 2006; U.S. patent application Ser. No. 60/798,031, entitled "DYNAMIC TARGET INTERFACE", filed on May 6, 2006; and U.S. Design Patent Application Ser. No. 29/259,348, entitled "TRACKED CONTROLLER DEVICE", filed on May 6, 2006; all of which are hereby incorporated herein by reference in their entireties.

CROSS-REFERENCE TO RELATED APPLICATION

This application is also related to co-pending U.S. patent application Ser. No. 11/430,594, to Gary Zalewski and Riley R. Russell, entitled "Profile Detection", filed on the same day as this application, the entire disclosure of which is incorporated herein by reference.

This application is also related to co-pending U.S. patent application Ser. No. 11/430,593, to Gary Zalewski and Riley R. Russell, entitled "Using Audio/Visual Environment To Select Ads On Game Platform", filed on the same day as this application, the entire disclosure of which is incorporated herein by reference.

This application is also related to co-pending U.S. patent app. Ser. No. 11/400,997, filed on Apr. 10, 2006, to Larsen and Chen, entitled "System And Method For Obtaining User Information From Voices", the entire disclosure of which is incorporated herein by reference.

This application is also related to co-pending U.S. patent application Ser. No. 11/382,259, to Gary Zalewski et al., entitled "Method and apparatus for use in determining lack of user activity in relation to a system", filed on the same day as this application, the entire disclosure of which is incorporated herein by reference.

This application is also related to co-pending U.S. patent application Ser. No. 11/382,258, to Gary Zalewski et al., entitled "Method and apparatus for use in determining an activity level of a user in relation to a system", filed on the same day as this application, the entire disclosure of which is incorporated herein by reference.

This application is also related to co-pending U.S. patent application Ser. No. 11/382,251, to Gary Zalewski et al., entitled "Hand-held controller having detectable elements for tracking purposes", filed on the same day as this application, the entire disclosure of which is incorporated herein by reference.

This application is also related to co-pending U.S. patent application No. 11/382,252, entitled "TRACKING DEVICE FOR USE IN OBTAINING INFORMATION FOR CONTROLLING GAME PROGRAM EXECUTION", filed on the same day as this application, the entire disclosure of which is incorporated herein by reference.

This application is also related to co-pending U.S. patent application No. 11/382,250, entitled "OBTAINING INPUT FOR CONTROLLING EXECUTION OF A GAME PROGRAM", filed on the same day as this application, the entire disclosure of which is incorporated herein by reference.

This application is also related to co-pending U.S. Design patent application Ser. No. 29/246,744, entitled "VIDEO GAME CONTROLLER FRONT FACE", filed on the same day as this application, the entire disclosure of which is incorporated herein by reference.

This application is also related to co-pending U.S. Design patent application No. 29/246,743, entitled "VIDEO GAME CONTROLLER", filed on the same day as this application, the entire disclosure of which is incorporated herein by reference.

This application is also related to co-pending U.S. Design patent application Ser. No. 29/246,767, entitled "VIDEO GAME CONTROLLER", filed on the same day as this application, the entire disclosure of which is incorporated herein by reference.

This application is also related to co-pending U.S. Design patent application Ser. No. 29/246,768, entitled "VIDEO GAME CONTROLLER", filed on the same day as this application, the entire disclosure of which is incorporated herein by reference.

This application is also related to co-pending U.S. Design patent application Ser. No. 29/246,763, entitled "ERGONOMIC GAME CONTROLLER DEVICE WITH LEDS AND OPTICAL PORTS", filed on the same day as this application, the entire disclosure of which is incorporated herein by reference.

This application is also related to co-pending U.S. Design patent application Ser. No. 29/246,759, entitled "GAME CONTROLLER DEVICE WITH LEDS AND OPTICAL PORTS", filed on the same day as this application, the entire disclosure of which is incorporated herein by reference.

This application is also related to co-pending U.S. Design patent application Ser. No. 29/246,765, entitled "DESIGN FOR OPTICAL GAME CONTROLLER INTERFACE", filed on the same day as this application, the entire disclosure of which is incorporated herein by reference.

This application is also related to co-pending U.S. Design patent application Ser. No. 29/246,766, entitled "DUAL GRIP GAME CONTROL DEVICE WITH LEDS AND OPTICAL PORTS", filed on the same day as this application, the entire disclosure of which is incorporated herein by reference.

This application is also related to co-pending U.S. Design patent application Ser. No. 29/246,764, entitled "GAME INTERFACE DEVICE WITH LEDS AND OPTICAL PORTS", filed on the same day as this application, the entire disclosure of which is incorporated herein by reference.

This application is also related to co-pending U.S. Design patent application Ser. No. 29/246,762, entitled "ERGONOMIC GAME INTERFACE DEVICE WITH LEDS AND OPTICAL PORTS", filed on the same day as this application, the entire disclosure of which is incorporated herein by reference.

FIELD OF THE INVENTION

Embodiments of the present invention are directed to audio signal processing and more particularly to processing of audio signals from microphone arrays.

BACKGROUND OF THE INVENTION

Many consumer electronic devices could benefit from a directional microphone that filters out sounds coming from outside a relatively narrow listening zone. Although such directional microphones are available they tend to be either bulky or expensive or both. Consequently such directional microphones are unsuitable for applications in consumer electronics.

Microphone arrays are often used to provide beam-forming for either noise reduction or echo-position, or both, by detecting the sound source direction or location. A typical microphone array has two or more microphones in fixed positions relative to each other with adjacent microphones separated by a known geometry, e.g., a known distance and/or known layout of the microphones. Depending on the orientation of the array, a sound originating from a source remote from the microphone array can arrive at different microphones at different times. Differences in time of arrival at different microphones in the array can be used to derive information about the direction or location of the source. Conventional microphone direction detection techniques analyze the correlation between signals from different microphones to determine the direction to the location of the source. Although effective, this technique is computationally intensive and is not robust. Such drawbacks make such techniques unsuitable for use in hand-held devices and consumer electronic applications, such as video game controllers.

Thus, there is a need in the art, for microphone array technique that overcomes the above disadvantages.

SUMMARY OF THE INVENTION

Embodiments of the invention are directed to methods and apparatus for targeted sound detection. In embodiments of the invention may be implemented with a microphone array having two or more microphones $M_0 \ldots M_M$. Each microphone is coupled to a plurality of filters. The filters are configured to filter input signals corresponding to sounds detected by the microphones thereby generating a filtered output. One or more sets of filter parameters for the plurality of filters are pre-calibrated to determine one or more corresponding pre-calibrated listening zones. Each set of filter parameters is selected to detect portions of the input signals corresponding to sounds originating within a given listening zone and filter out sounds originating outside the given listening zone. A particular pre-calibrated listening zone is selected at a runtime by applying to the plurality of filters a set of filter coefficients corresponding to the particular pre-calibrated listening zone. As a result, the microphone array may detect sounds originating within the particular listening sector and filter out sounds originating outside the particular listening zone. Sounds are detected with the microphone array. A particular listening zone containing a source of the sound is identified. The sound or the source of the sound is characterized and the sound is emphasized or filtered out depending on how the sound is characterized.

BRIEF DESCRIPTION OF THE DRAWINGS

The teachings of the present invention can be readily understood by considering the following detailed description in conjunction with the accompanying drawings, in which:

FIG. 1C is a schematic diagram illustrating targeted sound detection according to a preferred embodiment of the present invention.

FIG. 1D is a flow diagram illustrating a method for targeted sound detection according to the preferred embodiment of the present invention.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
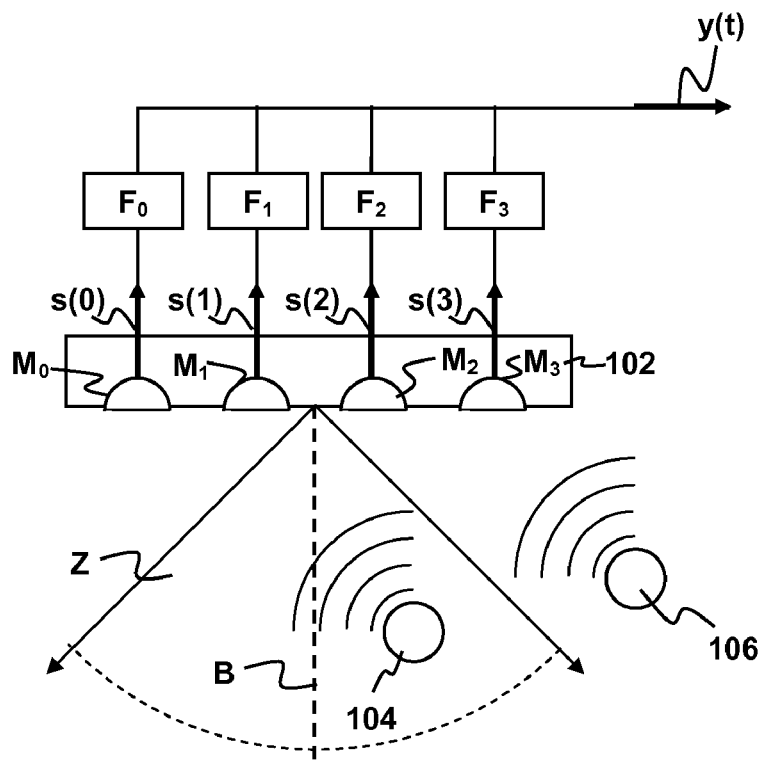
FIG. 1A is a schematic diagram of a microphone array according to an embodiment of the present invention.

As depicted in FIG. 1A, a microphone array 102 may include four microphones $M_0$, $M_1$, $M_2$, and $M_3$ that are coupled to corresponding signal filters $F_0$, $F_1$, $F_2$ and $F_3$. Each of the filters may implement some combination of finite impulse response (FIR) filtering and time delay of arrival (TDA) filtering. In general, the microphones $M_0$, $M_1$, $M_2$, and $M_3$ may be omni-directional microphones, i.e., microphones that can detect sound from essentially any direction. Omni-directional microphones are generally simpler in construction and less expensive than microphones having a preferred listening direction. The microphones $M_0$, $M_1$, $M_2$, and $M_3$ produce corresponding outputs $x_0(t)$, $x_1(t)$, $x_2(t)$, $x_3(t)$. These outputs serve as inputs to the filters $F_0$, $F_1$, $F_2$ and $F_3$. Each filter may apply a time delay of arrival (TDA) and/or a finite impulse response (FIR) to its input. The outputs of the filters may be combined into a filtered output y(t). Although four microphones $M_0$, $M_1$, $M_2$ and $M_3$ and four filters $F_0$, $F_1$, $F_2$ and $F_3$ are depicted in FIG. 1A for the sake of example, those of skill in the art will recognize that embodiments of the present invention may include any number of microphones greater than two and any corresponding number of filters.

An audio signal arriving at the microphone array 102 from one or more sources 104, 106 may be expressed as a vector $x=[x_0, x_1, x_2, x_3]$, where $x_0$, $x_1$, $x_2$ and $x_3$ are the signals received by the microphones $M_0$, $M_1$, $M_2$ and $M_3$ respectively. Each signal $x_m$ generally includes subcomponents due to different sources of sounds. The subscript m ranges from 0 to 3 in this example and is used to distinguish among the different microphones in the array. The subcomponents may be expressed as a vector $s=[s_1, s_2, \ldots s_K]$, where K is the number of different sources.

To separate out sounds from the signal s originating from different sources one must determine the best TDA filter for each of the filters $F_0$, $F_1$, $F_2$ and $F_3$. To facilitate separation of sounds from the sources 104, 106, the filters $F_0$, $F_1$, $F_2$ and $F_3$ are pre-calibrated with filter parameters (e.g., FIR filter coefficients and/or TDA values) that define one or more pre-calibrated listening zones Z. Each listening zone Z is a region of space proximate the microphone array 102. The parameters are chosen such that sounds originating from a source 104 located within the listening zone Z are detected while sounds originating from a source 106 located outside the listening zone Z are filtered out, i.e., substantially attenuated. In the example depicted in FIG. 1A, the listening zone Z is depicted as being a more or less wedge-shaped sector having an origin located at or proximate the center of the microphone array 102. Alternatively, the listening zone Z may be a discrete volume, e.g., a rectangular, spherical, conical or arbitrarily-shaped volume in space. Wedge-shaped listening zones can be robustly established using a linear array of microphones. Robust listening zones defined by arbitrarily-shaped volumes may be established using a planar array or an array of at least four microphones where in at least one microphone lies in a different plane from the others. Such an array is referred to herein as a "concave" microphone array.

As depicted in the flow diagram of FIG. 1B, a method 110 for targeted voice detection using the microphone array 102 may proceed as follows. As indicated at 112, one or more sets of the filter coefficients for the filters $F_0$, $F_1$, $F_2$ and $F_3$ are determined corresponding to one or more pre-calibrated listening zones Z. Each set of filter coefficients is selected to detect portions of the input signals corresponding to sounds originating within a given listening sector and filters out sounds originating outside the given listening sector. To pre-calibrate the listening sectors S one or more known calibration sound sources may be placed at several different known locations within and outside the sector S. During calibration, the calibration source(s) may emit sounds characterized by known spectral distributions similar to sounds the microphone array 102 is likely to encounter at runtime. The known locations and spectral characteristics of the sources may then be used to select the values of the filter parameters for the filters $F_0$, $F_1$, $F_2$ and $F_3$ By way of example, and without limitation, Blind Source Separation (BSS) may be used to pre-calibrate the filters $F_0$, $F_1$, $F_2$ and $F_3$ to define the listening zones Z. Blind source separation separates a set of signals into a set of other signals, such that the regularity of each resulting signal is maximized, and the regularity between the signals is minimized (i.e., statistical independence is maximized or decorrelation is minimized). The blind source separation may involve an independent component analysis (ICA) that is based on second-order statistics. In such a case, the data for the signal arriving at each microphone may be represented by the random vector $x_m = [x_1, \ldots x_n]$ and the components as a random vector $s = [s_1, \ldots s_n]$ The task is to transform the observed data $x_m$, using a linear static transformation s=Wx, into maximally independent components s measured by some function $F(s_1, \ldots s_n)$ of independence.

The components $x_{mi}$ of the observed random vector $x_m = (x_{m1}, \ldots, x_{mn})$ are generated as a sum of the independent components $s_{mk}$, k=1, . . . ,n, $x_{mi} = a_{mi1}s_{m1} + \ldots + a_{mik}s_{mk} + \ldots + a_{min}s_{mn}$, weighted by the mixing weights $a_{mik}$. In other words, the data vector $x_m$ can be written as the product of a mixing matrix A with the source vector $s^T$, i.e., $x_m = A \cdot s^T$ or $$\begin{bmatrix} x_{m1} \\ \vdots \\ x_{mn} \end{bmatrix} = \begin{bmatrix} a_{m11} & \cdots & a_{m1n} \\ \vdots & \cdots & \vdots \\ a_{mn1} & \cdots & a_{mnn} \end{bmatrix} \cdot \begin{bmatrix} s_1 \\ \vdots \\ s_n \end{bmatrix}$$

The original sources s can be recovered by multiplying the observed signal vector $x_m$ with the inverse of the mixing matrix $W = A^{-1}$, also known as the unmixing matrix. Determination of the unmixing matrix $A^{-1}$ may be computationally intensive. Embodiments of the invention use blind source separation (BSS) to determine a listening direction for the microphone array. The listening zones Z of the microphone array 102 can be calibrated prior to run time (e.g., during design and/or manufacture of the microphone array) and may optionally be re-calibrated at run time.

By way of example, the listening zone Z may be pre-calibrated as follows. A user standing within the listening zone Z may record speech for about 10 to 30 seconds. Preferably, the recording room does not contain transient interferences, such as competing speech, background music, etc. Pre-determined intervals, e.g., about every 8 milliseconds, of the recorded voice signal may be formed into analysis frames and transformed from the time domain into the frequency domain. Voice-Activity Detection (VAD) may be performed over each frequency-bin component in this frame. Only bins that contain strong voice signals are collected in each frame and used to estimate its $2^{nd}$-order statistics, for each frequency bin within the frame, i.e. a "Calibration Covariance Matrix" $\text{Cal\_Cov}(j,k) = E((X'_{jk})^T * X'_{jk})$, where E refers to the operation of determining the expectation value and $(X'_{jk})^T$ is the transpose of the vector $X'_{jk}$. The vector $X'_{jk}$ is a M+1 dimensional vector representing the Fourier transform of calibration signals for the $j^{th}$ frame and the $k^{th}$ frequency bin.

The accumulated covariance matrix then contains the strongest signal correlation that is emitted from the target listening direction. Each calibration covariance matrix $\text{Cal\_Cov}(j,k)$ may be decomposed by means of "Principal Component Analysis" (PCA) and its corresponding eigenmatrix C may be generated. The inverse $C^{-1}$ of the eigenmatrix C may thus be regarded as a "listening direction" that essentially contains the most information to de-correlate the covariance matrix, and is saved as a calibration result. As used herein, the term "eigenmatrix" of the calibration covariance matrix $\text{Cal\_Cov}(j,k)$ refers to a matrix having columns (or rows) that are the eigenvectors of the covariance matrix.

At run time, this inverse eigenmatrix $C^{-1}$ may be used to de-correlate the mixing matrix A by a simple linear transformation. After de-correlation, A is well approximated by its diagonal principal vector, thus the computation of the unmixing matrix (i.e., $A^{-1}$) is reduced to computing a linear vector inverse of:

$$A1 = A * C^{-1}$$

A1 is the new transformed mixing matrix in independent component analysis (ICA). The principal vector is just the diagonal of the matrix A1.

The process may be refined by repeating the above procedure with the user standing at different locations within the listening zone Z. In microphone-array noise reduction it is preferred for the user to move around inside the listening sector during calibration so that the beamforming has a certain tolerance (essentially forming a listening cone area) that provides a user some flexible moving space while talking. In embodiments of the present invention, by contrast, voice/sound detection need not be calibrated for the entire cone area of the listening sector S. Instead the listening sector is preferably calibrated for a very narrow beam B along the center of the listening zone Z, so that the final sector determination based on noise suppression ratio becomes more robust. The process may be repeated for one or more additional listening zones.

Recalibration in runtime may follow the preceding steps. However, the default calibration in manufacture takes a very large amount of recording data (e.g., tens of hours of clean voices from hundreds of persons) to ensure an unbiased, person-independent statistical estimation. While the recalibration at runtime requires small amount of recording data from a particular person, the resulting estimation of $C^{-1}$ is thus biased and person-dependant.

As described above, a principal component analysis (PCA) may be used to determine eigenvalues that diagonalize the mixing matrix A. The prior knowledge of the listening direction allows the energy of the mixing matrix A to be compressed to its diagonal. This procedure, referred to herein as semi-blind source separation (SBSS) greatly simplifies the calculation the independent component vector $s^T$.

Embodiments of the present invention may also make use of anti-causal filtering. To illustrate anti-causal filtering, consider a situation in which one microphone, e.g., $M_0$ is chosen as a reference microphone for the microphone array 102. In order for the signal x(t) from the microphone array to be causal, signals from the source 104 must arrive at the reference microphone $M_0$ first. However, if the signal arrives at any of the other microphones first, $M_0$ cannot be used as a reference microphone. Generally, the signal will arrive first at the microphone closest to the source 104. Embodiments of the present invention adjust for variations in the position of the source 104 by switching the reference microphone among the microphones $M_0$, $M_1$, $M_2$, $M_3$ in the array 102 so that the reference microphone always receives the signal first. Specifically, this anti-causality may be accomplished by artificially delaying the signals received at all the microphones in the array except for the reference microphone while minimizing the length of the delay filter used to accomplish this.

For example, if microphone $M_0$ is the reference microphone, the signals at the other three (non-reference) microphones $M_1$, $M_2$, $M_3$ may be adjusted by a fractional delay $\Delta t_m$, (m=1, 2, 3) based on the system output y(t). The fractional delay $\Delta t_m$ may be adjusted based on a change in the signal to noise ratio (SNR) of the system output y(t). Generally, the delay is chosen in a way that maximizes SNR. For example, in the case of a discrete time signal the delay for the signal from each non-reference microphone $\Delta t_m$ at time sample t may be calculated according to: $\Delta t_m(t)=\Delta t_m(t-1)+\mu\Delta SNR$, where $\Delta SNR$ is the change in SNR between t−2 and t−1 and $\mu$ is a pre-defined step size, which may be empirically determined. If $\Delta t(t)>1$ the delay has been increased by 1 sample. In embodiments of the invention using such delays for anti-causality, the total delay (i.e., the sum of the $\Delta t_m$) is typically 2-3 integer samples. This may be accomplished by use of 2-3 filter taps. This is a relatively small amount of delay when one considers that typical digital signal processors may use digital filters with up to 512 taps. However, switching between different pre-calibrated listening sectors may be more robust when significantly fewer filter taps are used. For example, 128 taps may be used for the array beamforming filter for this voice detection, 512 taps may be used for array beamforming for noise-reduction purposes, and about 2 to 5 taps may be used for delay filters in both cases It is noted that applying the artificial delays $\Delta t_m$ to the non-reference microphones is the digital equivalent of physically orienting the array 102 such that the reference microphone $M_0$ is closest to the sound source 104. Appropriate configuration of the filters $F_0$, $F_1$, $F_2$ and $F_3$ and the delays $\Delta t_0$, $\Delta t_0$, $\Delta t_0$, and $\Delta t_0$ may be used to establish the pre-calibrated listening sector S.

Referring again to FIG. 1B, as indicated at 114 a particular pre-calibrated listening zone Z may be selected at a runtime by applying to the filters $F_0$, $F_1$, $F_2$ and $F_3$ a set of filter parameters corresponding to the particular pre-calibrated listening zone Z. As a result, the microphone array may detect sounds originating within the particular listening sector and filter out sounds originating outside the particular listening sector. Although a single listening sector is shown in FIG. 1A, embodiments of the present invention may be extended to situations in which a plurality of different listening sectors are pre-calibrated. As indicated at 116 of FIG. 1B, the microphone array 102 can then track between two or more pre-calibrated sectors at runtime to determine in which sector a sound source resides. For example as illustrated in FIG. 1C, the space surrounding the microphone array 102 may be divided into multiple listening zones in the form of eighteen different pre-calibrated 20 degree wedge-shaped listening sectors $S_0 \ldots S_{17}$ that encompass about 360 degrees surrounding the microphone array 102 by repeating the calibration procedure outlined above each of the different sectors and associating a different set of FIR filter coefficients and TDA values with each different sector. By applying an appropriate set of pre-determined filter settings (e.g., FIR filter coefficients and/or TDA values determined during calibration as described above) to the filters $F_0$, $F_1$, $F_2$, $F_3$ any of the listening sectors $S_0 \ldots S_{17}$ may be selected.

By switching from one set of pre-determined filter settings to another, the microphone array 102 can switch from one sector to another to track a sound source 104 from one sector to another. For example, referring again to FIG. 1C, consider a situation where the sound source 104 is located in sector $S_7$ and the filters $F_0$, $F_1$, $F_2$, $F_3$ are set to select sector $S_4$. Since the filters are set to filter out sounds coming from outside sector $S_4$ the input energy E of sounds from the sound source 104 will be attenuated. The input energy E may be defined as a dot product:

$$E = 1/M \sum_m x_m^T(t) \cdot x_m(t)$$

Where $x_m^T(t)$ is the transpose of the vector $x_m(t)$, which represents microphone output $x_m(t)$. And the sum is an average taken over all M microphones in the array.

The attenuation of the input energy E may be determined from the ratio of the input energy E to the filter output energy, i.e.:

$$\text{Attenuation} = 1/M \frac{\sum_m x_m^T(t) \cdot x_m(t)}{y^T(t) \cdot y(t)}.$$

If the filters are set to select the sector containing the sound source 104 the attenuation is approximately equal to 1. Thus, the sound source 104 may be tracked by switching the settings of the filters $F_0$, $F_1$, $F_2$, $F_3$ from one sector setting to another and determining the attenuation for different sectors. A targeted voice detection 120 method using determination of attenuation for different listening sectors may proceed as depicted in the flow diagram of FIG. 1D. At 122 any pre-calibrated listening sector may be selected initially. For example, sector $S_4$, which corresponds roughly to a forward listening direction, may be selected as a default initial listening sector. At 124 an input signal energy attenuation is determined for the initial listen sector. If, at 126 the attenuation is not an optimum value another pre-calibrated sector may be selected at 128. If, at 126 the attenuation is an optimum value, the tracking is stopped at 129.

There are a number of different ways to search through the sectors $S_0 \ldots S_{17}$ for the sector containing the sound source 104. For example, by comparing the input signal energies for the microphones $M_0$ and $M_3$ at the far ends of the array it is possible to determine whether the sound source 104 is to one side or the other of the default sector $S_4$. For example, in some cases the correct sector may be "behind" the microphone array 102, e.g., in sectors $S_9 \ldots S_{17}$. In many cases the mounting of the microphone array may introduce a built-in attenuation of sounds coming from these sectors such that there is a minimum attenuation, e.g., of about 1 dB, when the source 104 is located in any of these sectors. Consequently it may be determined from the input signal attenuation whether the source 104 is "in front" or "behind" the microphone array 102.

As a first approximation, the sound source 104 might be expected to be closer to the microphone having the larger input signal energy. In the example depicted in FIG. 1C, it would be expected that the right hand microphone $M_3$ would have the larger input signal energy and, by process of elimination, the sound source 104 would be in one of sectors $S_6$, $S_7$, $S_8$, $S_9$, $S_{10}$, $S_{11}$, $S_{12}$. Preferably, the next sector selected is one that is approximately 90 degrees away from the initial sector $S_4$ in a direction toward the right hand microphone $M_3$, e.g., sector $S_8$. The input signal energy attenuation for sector $S_8$ may be determined as indicated at 124. If the attenuation is not the optimum value another sector may be selected at 126. By way of example, the next sector may be one that is approximately 45 degrees away from the previous sector in the direction back toward the initial sector, e.g., sector $S_6$. Again the input signal energy attenuation may be determined and compared to the optimum attenuation. If the input signal energy is not close to the optimum only two sectors remain in this example. Thus, for the example depicted in FIG. 1C, in a maximum of four sector switches, the correct sector may be determined. The process of determining the input signal energy attenuation and switching between different listening sectors may be accomplished in about 100 milliseconds if the input signal is sufficiently strong.

Sound source location as described above may be used in conjunction with a sound source location and characterization technique referred to herein as "acoustic radar". FIG. 1E depicts an example of a sound source location and characterization apparatus 130 having a microphone array 102 described above coupled to an electronic device 132 having a processor 134 and memory 136. The device may be a video game, television or other consumer electronic device. The processor 134 may execute instructions that implement the FIR filters and time delays described above. The memory 136 may contain data 138 relating to pre-calibration of a plurality of listening zones. By way of example the pre-calibrated listening zones may include wedge shaped listening sectors $S_0$, $S_1$, $S_2$, $S_3$, $S_4$, $S_5$, $S_6$, $S_7$, $S_8$.

Figure 1B:
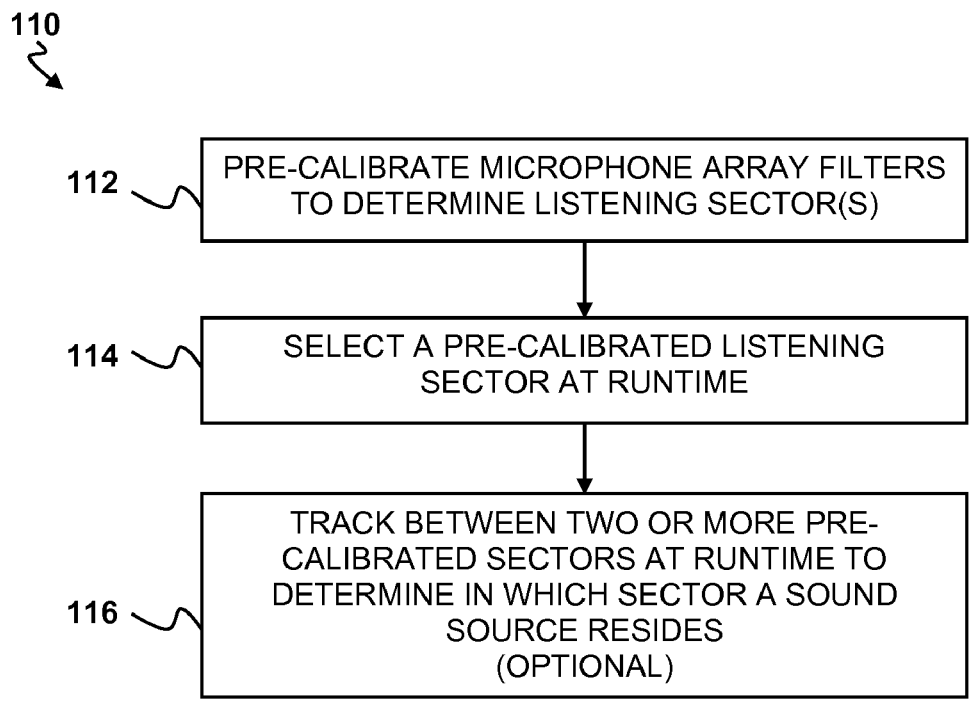
FIG. 1B is a flow diagram illustrating a method for targeted sound detection according to an embodiment of the present invention.
Figure 1E:
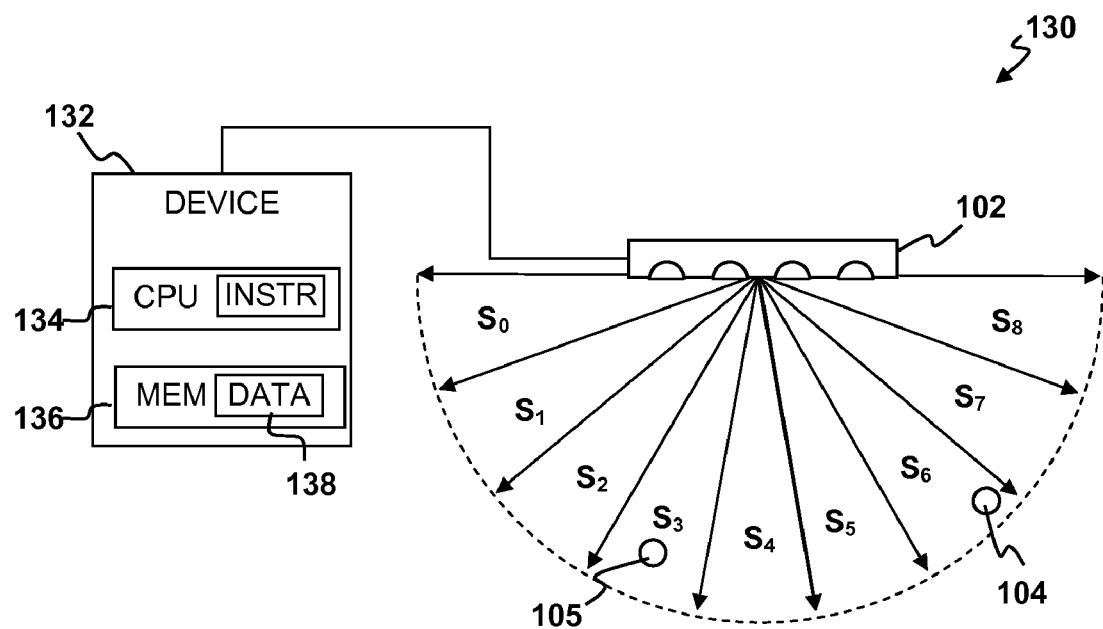
FIG. 1E is a top plan view of a sound source location and characterization apparatus according to an embodiment of the present invention.
Figure 1F:
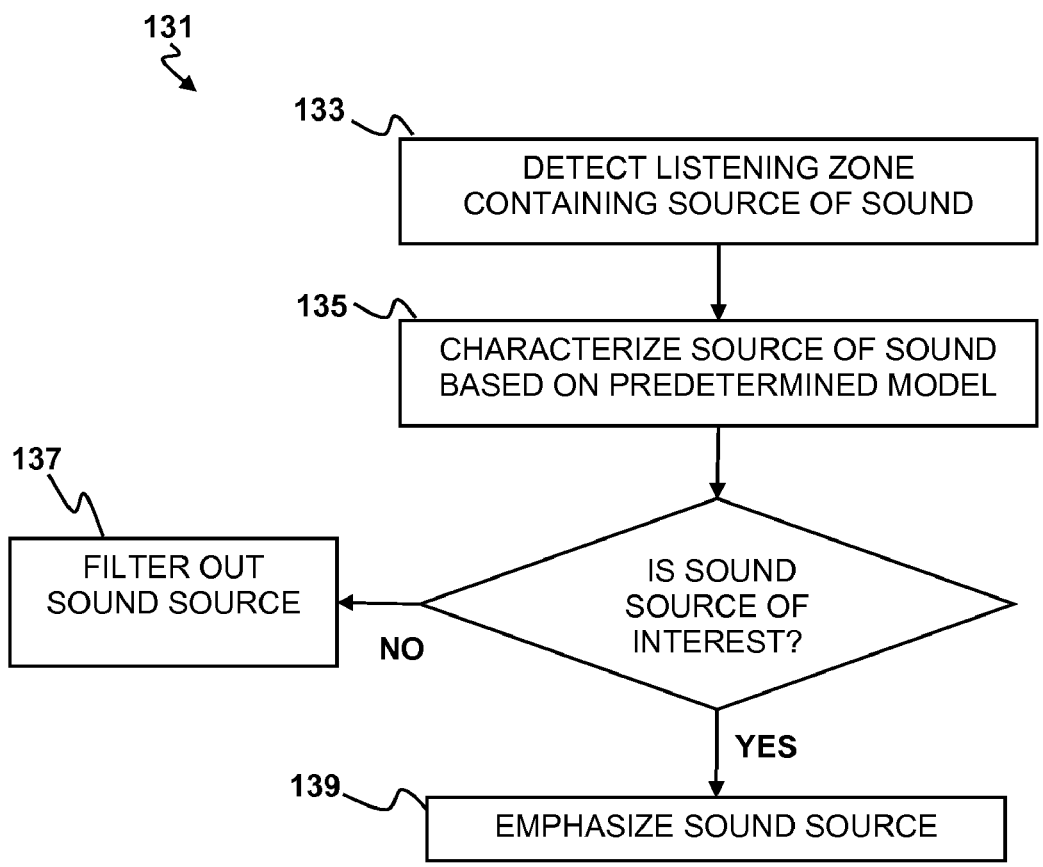
FIG. 1F is a flow diagram illustrating a method for sound source location and characterization according to an embodiment of the present invention.

The instructions run by the processor 134 may operate the apparatus 130 according to a method as set forth in the flow diagram 131 of FIG. 1F. Sound sources 104, 105 within the listening zones can be detected using the microphone array 102. One sound source 104 may be of interest to the device 132 or a user of the device. Another sound source 105 may be a source of background noise or otherwise not of interest to the device 132 or its user. Once the microphone array 102 detects a sound the apparatus 130 determines which listening zone contains the sound's source 104 as indicated at 133 of FIG. 1F. By way of example, the iterative sound source sector location routine described above with respect to FIGS. 1C-1D may be used to determine the pre-calibrated listening zones containing the sound sources 104, 105 (e.g., sectors $S_3$ and $S_6$ respectively).

Once a listening zone containing the sound source has been identified, the microphone array may be refocused on the sound source, e.g., using adaptive beam forming. The use of adaptive beam forming techniques is described, e.g., in U.S. Patent Application Publication Number 2005/0047611 A1. to Xiadong Mao, which is incorporated herein by reference. The sound source 104 may then be characterized as indicated at 135, e.g., through analysis of an acoustic spectrum of the sound signals originating from the sound source. Specifically, a time domain signal from the sound source may be analyzed over a predetermined time window and a fast Fourier transform (FFT) may be performed to obtain a frequency distribution characteristic of the sound source. The detected frequency distribution may be compared to a known acoustic model. The known acoustic model may be a frequency distribution generated from training data obtained from a known source of sound. A number of different acoustic models may be stored as part of the data 138 in the memory 136 or other storage medium and compared to the detected frequency distribution. By comparing the detected sounds from the sources 104, 105 against these acoustic models a number of different possible sound sources may be identified.

Based upon the characterization of the sound source 104, 105, the apparatus 132 may take appropriate action depending upon whether the sound source is of interest or not. For example, if the sound source 104 is determined to be one of interest to the device 132, the apparatus may emphasize or amplify sounds coming from sector $S_3$ and/or take other appropriate action. For example, if the device 132 is a video game controller and the source 104 is a video game player, the device 132 may execute game instructions such as "jump" or "swing" in response to sounds from the source 104 that are interpreted as game commands. Similarly, if the sound source 105 is determined not to be of interest to the device 132 or its user, the device may filter out sounds coming from sector $S_6$ or take other appropriate action. In some embodiments, for example, an icon may appear on a display screen indicating the listening zone containing the sound source and the type of sound source.

In some embodiments, amplifying sound or taking other appropriate action may include reducing noise disturbances associated with a source of sound. For example, a noise disturbance of an audio signal associated with sound source 104 may be magnified relative to a remaining component of the audio signal. Then, a sampling rate of the audio signal may be decreased and an even order derivative is applied to the audio signal having the decreased sampling rate to define a detection signal. Then, the noise disturbance of the audio signal may be adjusted according to a statistical average of the detection signal. A system capable of canceling disturbances associated with an audio signal, a video game controller, and an integrated circuit for reducing noise disturbances associated with an audio signal are included. Details of a such a technique are described, e.g., in commonly-assigned U.S. patent application Ser. No. 10/820,469, to Xiadong Mao entitled "METHOD AND APPARATUS TO DETECT AND REMOVE AUDIO DISTURBANCES", which was filed Apr. 7, 2004 and published on Oct. 13, 2005 as US Patent Application Publication 20050226431, the entire disclosures of which are incorporated herein by reference.

By way of example, the apparatus 130 may be used in a baby monitoring application. Specifically, an acoustic model stored in the memory 136 may include a frequency distribution characteristic of a baby or even of a particular baby. Such a sound may be identified as being of interest to the device 130 or its user. Frequency distributions for other known sound sources, e.g., a telephone, television, radio, computer, persons talking, etc., may also be stored in the memory 136. These sound sources may be identified as not being of interest.

Sound source location and characterization apparatus and methods may be used in ultrasonic- and sonic-based consumer electronic remote controls, e.g., as described in commonly assigned U.S. patent application Ser. No. 11/418,993 to Steven Osman, entitled "SYSTEM AND METHOD FOR CONTROL BY AUDIBLE DEVICE", the entire disclosures of which are incorporated herein by reference. Specifically, a sound received by the microphone array may 102 be analyzed to determine whether or not it has one or more predetermined characteristics. If it is determined that the sound does have one or more predetermined characteristics, at least one control signal may be generated for the purpose of controlling at least one aspect of the device 132.

Figure 1G:
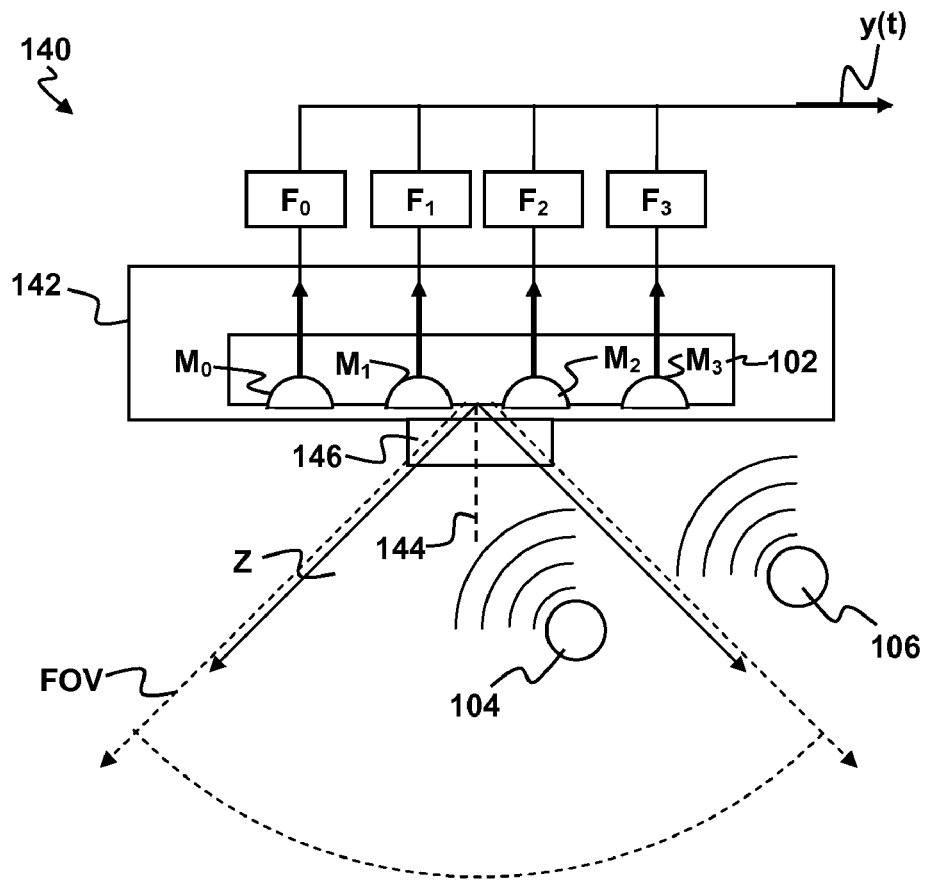
FIG. 1G is a top plan view schematic diagram of an apparatus having a camera and a microphone array for targeted sound detection from within a field of view of the camera according to an embodiment of the present invention.
Figure 1H:
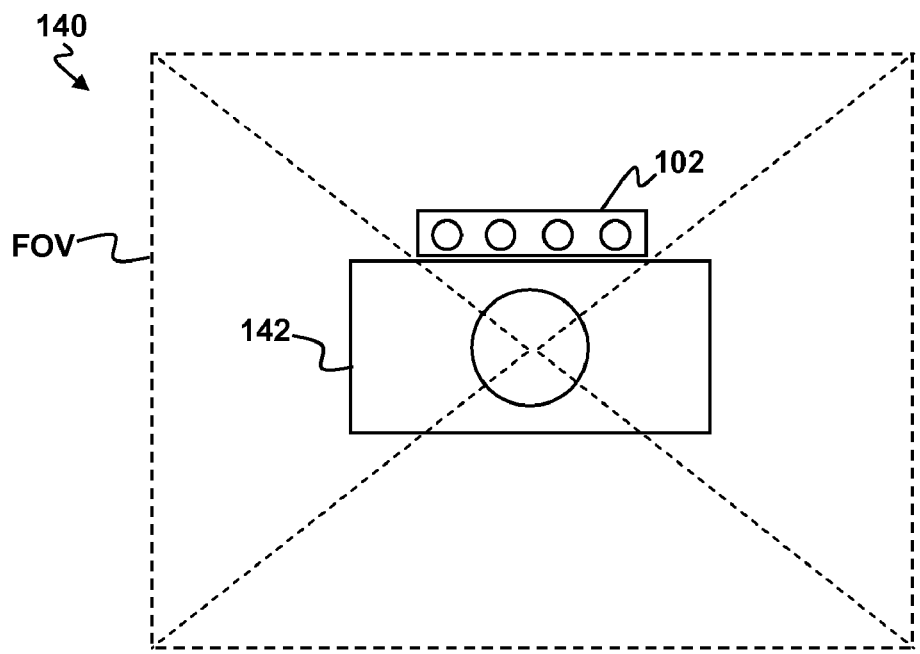
FIG. 1H is a front elevation view of the apparatus of FIG. 1E.

In some embodiments of the present invention, the pre-calibrated listening zone Z may correspond to the field-ofview of a camera. For example, as illustrated in FIGS. 1G-1H an audio-video apparatus 140 may include a microphone array 102 and signal filters $F_0$, $F_1$, $F_2$, $F_3$, e.g., as described above, and an image capture unit 142. By way of example, the image capture unit 142 may be a digital camera. An example of a suitable digital camera is a color digital camera sold under the name "EyeToy" by Logitech of Fremont, Calif. The image capture unit 142 may be mounted in a fixed position relative to the microphone array 102, e.g., by attaching the microphone array 102 to the image capture unit 142 or vice versa. Alternatively, both the microphone array 102 and image capture unit 142 may be attached to a common frame or mount (not shown). Preferably, the image capture unit 142 is oriented such that an optical axis 144 of its lens system 146 is aligned parallel to an axis perpendicular to a common plane of the microphones $M_0$, $M_1$, $M_2$, $M_3$ of the microphone array 102. The lens system 146 may be characterized by a volume of focus FOV that is sometimes referred to as the field of view of the image capture unit. In general, objects outside the field of view FOV do not appear in images generated by the image capture unit 142. The settings of the filters $F_0$, $F_1$, $F_2$, $F_3$ may be pre-calibrated such that the microphone array 102 has a listening zone Z that corresponds to the field of view FOV of the image capture unit 142. As used herein, the listening zone Z may be said to "correspond" to the field of view FOV if there is a significant overlap between the field of view FOV and the listening zone Z. As used herein, there is "significant overlap" if an object within the field of view FOV is also within the listening zone Z and an object outside the field of view FOV is also outside the listening zone Z. It is noted that the foregoing definitions of the terms "correspond" and "significant overlap" within the context of the embodiment depicted in FIGS. 1G-1H allow for the possibility that an object may be within the listening zone Z and outside the field of view FOV.

The listening zone Z may be pre-calibrated as described above, e.g., by adjusting FIR filter coefficients and TDA values for the filters $F_0$, $F_1$, $F_2$, $F_3$ using one or more known sources placed at various locations within the field of view FOV during the calibration stage. The FIR filter coefficients and TDA values are selected (e.g., using ICA) such that sounds from a source 104 located within the FOV are detected and sounds from a source 106 outside the FOV are filtered out. The apparatus 140 allows for improved processing of video and audio images. By pre-calibrating a listening zone Z to correspond to the field of view FOV of the image capture unit 142 sounds originating from sources within the FOV may be enhanced while those originating outside the FOV may be attenuated. Applications for such an apparatus include audio-video (AV) chat.

Figure 1I:
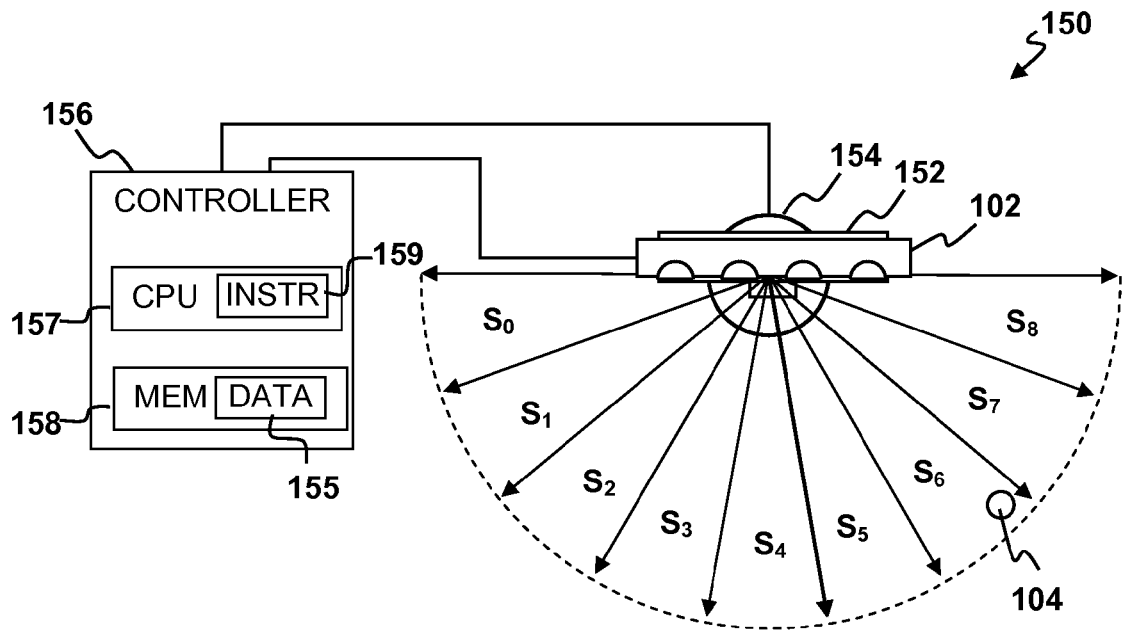
FIGS. 1I-1J are plan view schematic diagrams of an audio-video apparatus according to an alternative embodiment of the present invention.
Figure 1J:
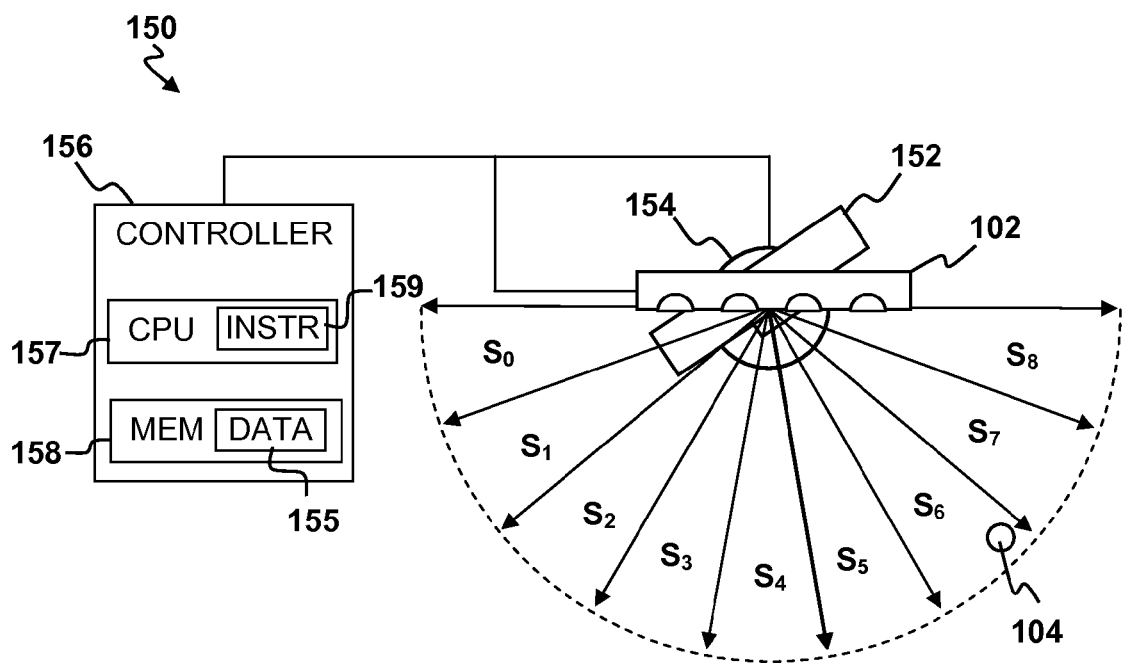

Although only a single pre-calibrated listening sector is depicted in FIGS. 1G-1H, embodiments of the present invention may use multiple pre-calibrated listening sectors in conjunction with a camera. For example, FIGS. 1I-1J depict an apparatus 150 having a microphone array 102 and an image capture unit 152 (e.g., a digital camera) that is mounted to one or more pointing actuators 154 (e.g., servo-motors). The microphone array 102, image capture unit 152 and actuators may be coupled to a controller 156 having a processor 157 and memory 158. Software data 155 stored in the memory 158 and instructions 159 stored in the memory 158 and executed by the processor 157 may implement the signal filter functions described above. The software data may include FIR filter coefficients and TDA values that correspond to a set of pre-calibrated listening zones, e.g., nine wedge-shaped sectors $S_0$ ... $S_8$ of twenty degrees each covering a 180 degree region in front of the microphone array 102. The pointing actuators 154 may point the image capture unit 152 in a viewing direction in response to signals generated by the processor 157. In embodiments of the present invention a listening zone containing a sound source 104 may be determined, e.g., as described above with respect to FIGS. 1C-1D. Once the sector containing the sound source 104 has been determined, the actuators 154 may point the image capture unit 152 in a direction of the particular pre-calibrated listening zone containing the sound source 104 as shown in FIG. 1J. The microphone array 102 may remain in a fixed position while the pointing actuators point the camera in the direction of a selected listening zone.

Figure 2:
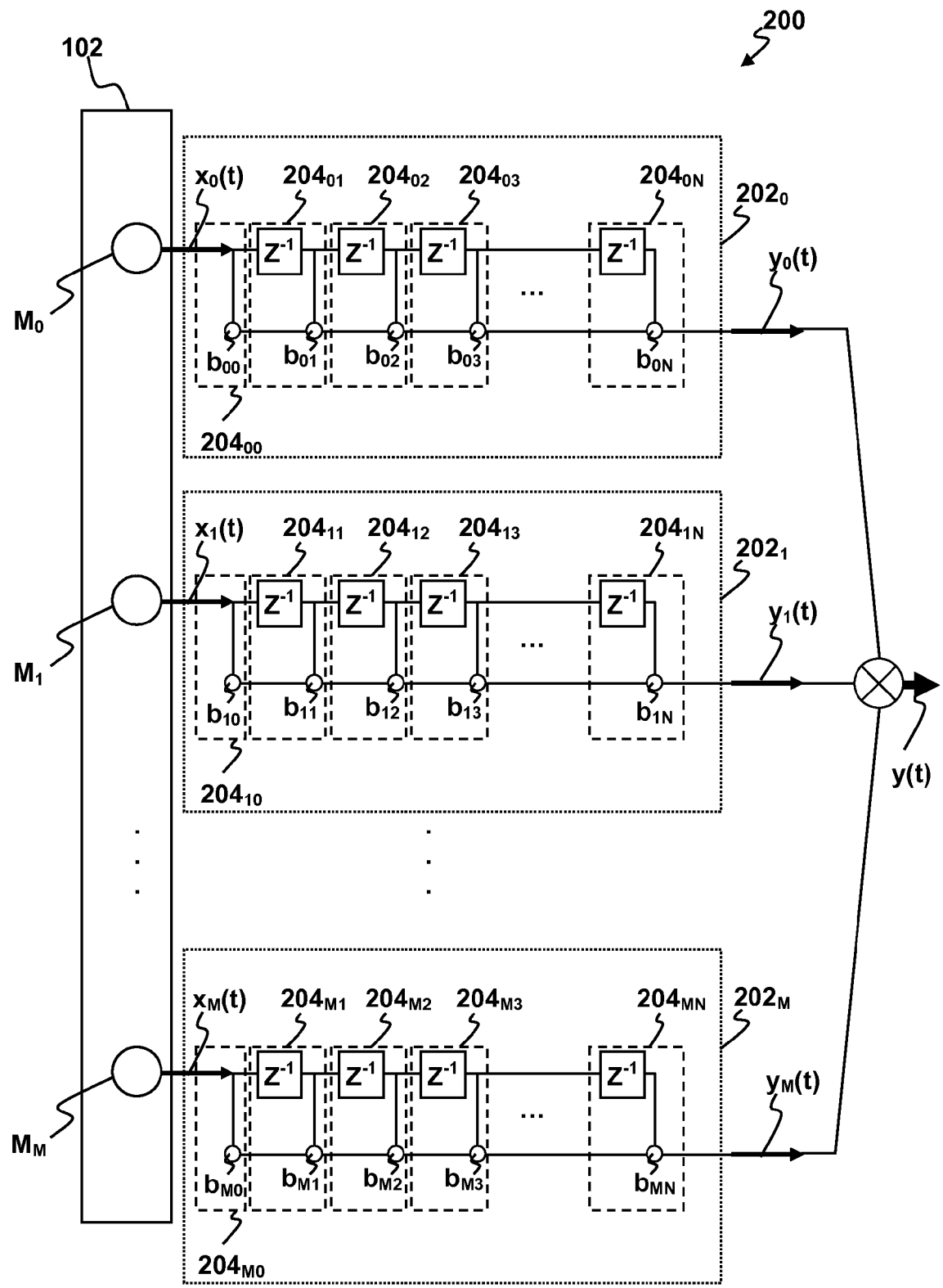
FIG. 2 is a schematic diagram of a microphone array and filter apparatus according to an embodiment of the present invention.

Part of the preceding discussion refers to filtering of the input signals $x_m(t)$ from the microphones $M_0$ ... $M_3$ with the filters $F_0$ ... $F_3$ to produce an output signal y(t). By way of example, and without limitation, such filtering may proceed as discussed below with respect to FIGS. 2-3. FIG. 2 depicts a system 200 having microphone array 102 of M+1 microphones $M_0$, $M_1$ ... $M_M$. Each microphone is connected to one of M+1 corresponding filters $202_0$, $202_1$, ..., $202_M$. Each of the filters $202_0$, $202_1$, ..., $202_M$ includes a corresponding set of N+1 filter taps $204_{00}$, ..., $204_{0N}$, $204_{10}$, ..., $204_{1N}$, $204_{M0}$, ..., $204_{MN}$. Each filter tap $204_{mi}$ includes a finite impulse response filter $b_{mi}$, where m=0 ... M, i=0 ... N. Except for the first filter tap $204_{m0}$ in each filter $202_m$, the filter taps $204_{mi}$ also include delays indicated by z-transforms $Z^{-1}$. Each delay section introduces a unit integer delay to the input signal $x_m(t)$. The delays and filter taps may be implemented in hardware or software or a combination of both hardware and software. Each filter $202_m$ produces a corresponding output $y_m(t)$, which may be regarded as the components of a combined output y(t) of the filters $202_m$. Fractional delays may be applied to each of the output signals $y_m(t)$ as follows.

An output $y_m(t)$ from a given filter tap $204_{mi}$ is just the convolution of the input signal to filter tap $204_{mi}$ with the corresponding finite impulse response coefficient $b_{mi}$. It is noted that for all filter taps $204_{mi}$ except for the first one $204_{mo}$ the input to the filter tap is just the output of the delay section $z^{-1}$ of the preceding filter tap $204_{mi-1}$. The input signal from the microphones in the array 102 may be represented as an M+1-dimensional vector: $x(t)=(x_0(t), x_1(t), ..., x_M(t))$, where M+1 is the number of microphones in the array.

Thus, the output of a given filter $202_m$ may be represented by:

$y_m(t)=x_m(t)*b_0+x_m(t-1)*b_{m1}+x_m(t-2)*b_{m2}+ ... +x_m(t-N)b_{mN}$. Where the symbol "*" represents the convolution operation. Convolution between two discrete time functions f(t) and g(t) is defined as (f*g)(t)

$$(f*g)(t) = \sum_n f(n)g(t-n).$$

The general problem in audio signal processing is to select the values of the finite impulse response filter coefficients $b_{m0}$, $b_{m1}$, ..., $b_{mN}$ that best separate out different sources of sound from the signal $y_m(t)$.

If the signals $x_m(t)$ and $y_m(t)$ are discrete time signals each delay $z^{-1}$ is necessarily an integer delay and the size of the delay is inversely related to the maximum frequency of the microphone. This ordinarily limits the resolution of the system 200. A higher than normal resolution may be obtained if it is possible to introduce a fractional time delay Δ into the signal $y_m(t)$ so that:

$y_m(t+\Delta)=x_m(t+\Delta)*b_{m0}+x_m(t-1+\Delta)*b_{m1}+x_m(t-2+\Delta)*b_{m2}+ ... +x_m(t-N+\Delta)b_{mN}$, where $\Delta$ is between zero and ±1. In embodiments of the present invention, a fractional delay, or its equivalent, may be obtained as follows. First, the signal $x_m(t)$ is delayed by j samples. each of the finite impulse response filter coefficients $b_{mi}$ (where i=0, 1, ... N) may be represented as a (J+1)-dimensional column vector $$b_{mi} = \begin{bmatrix} b_{mi0} \\ b_{mi1} \\ \vdots \\ b_{miJ} \end{bmatrix}$$

and y(t) may be rewritten as:

$$y_m(t) = \begin{bmatrix} x_m(t) \\ x_m(t-1) \\ \vdots \\ x_m(t-J) \end{bmatrix}^T * \begin{bmatrix} b_{m00} \\ b_{m01} \\ \vdots \\ b_{m0j} \end{bmatrix} +$$

$$\begin{bmatrix} x_m(t-1) \\ x_m(t-2) \\ \vdots \\ x_m(t-J-1) \end{bmatrix}^T * \begin{bmatrix} b_{m10} \\ b_{m11} \\ \vdots \\ b_{m1J} \end{bmatrix} + \cdots + \begin{bmatrix} x_m(t-N-J) \\ x_m(t-N-J+1) \\ \vdots \\ x_m(t-N) \end{bmatrix}^T * \begin{bmatrix} b_{mN0} \\ b_{mN1} \\ \vdots \\ b_{mNJ} \end{bmatrix}$$

When $y_m(t)$ is represented in the form shown above one can interpolate the value of $y_m(t)$ for any factional value of t=t+$\Delta$. Specifically, three values of $y_m(t)$ can be used in a polynomial interpolation. The expected statistical precision of the fractional value $\Delta$ is inversely proportional to J+1, which is the number of "rows" in the immediately preceding expression for $y_m(t)$.

The quantity t+$\Delta$ may be regarded as a mathematical abstract to explain the idea in time-domain. In practice, one need not estimate the exact "t+$\Delta$". Instead, the signal $y_m(t)$ may be transformed into the frequency-domain, so there is no such explicit "t+$\Delta$". Instead an estimation of a frequency-domain function $F(b_i)$ is sufficient to provide the equivalent of a fractional delay $\Delta$. The above equation for the time domain output signal $y_m(t)$ may be transformed from the time domain to the frequency domain, e.g., by taking a Fourier transform, and the resulting equation may be solved for the frequency domain output signal $Y_m(k)$. This is equivalent to performing a Fourier transform (e.g., with a fast Fourier transform (fft)) for J+1 frames where each frequency bin in the Fourier transform is a (J+1)×1 column vector. The number of frequency bins is equal to N+1.

The finite impulse response filter coefficients $b_{mij}$ for each row of the equation above may be determined by taking a Fourier transform of x(t) and determining the $b_{mij}$ through semi-blind source separation. Specifically, for each "row" of the above equation becomes:

$$X_{m0} = FT(x_m(t, t-1, \ldots, t-N)) = [X_{00}, X_{01}, \ldots, X_{0N}]$$

$$X_{m1} = FT(x_m(t-1, t-2, \ldots, t-(N+1))) = [X_{10}, X_{11}, \ldots, X_{1N}]$$

$$\vdots$$

$$X_{mJ} = FT(x_m(t, t-1, \ldots, t-(N+J))) = [X_{J0}, X_{J1}, \ldots, X_{JN}],$$

where FT( ) represents the operation of taking the Fourier transform of the quantity in parentheses.

For an array having M+1 microphones, the quantities $X_{mj}$ are generally the components of (M+1)-dimensional vectors. By way of example, for a 4-channel microphone array, there are 4 input signals: $x_0(t)$, $x_1(t)$, $x_2(t)$, and $x_3(t)$. The 4-channel inputs $x_m(t)$ are transformed to the frequency domain, and collected as a 1×4 vector "$X_{jk}$". The outer product of the vector $X_{jk}$ becomes a 4×4 matrix, the statistical average of this matrix becomes a "Covariance" matrix, which shows the correlation between every vector element.

By way of example, the four input signals $x_0(t)$, $x_1(t)$, $x_2(t)$ and $x_3(t)$ may be transformed into the frequency domain with J+1=10 blocks. Specifically:

For channel 0:

$$X_{00}=FT([x_0(t-0), x_0(t-1), x_0(t-2), \ldots x_0(t-N-1+0)])$$

$$X_{00}=FT([x_0(t-1), x_0(t-2), x_0(t-3), \ldots x_0(t-N-1+1)])$$

$$\ldots$$

$$X_{09}=FT([x_0(t-9), x_0(t-10)\, x_0(t-2), \ldots x_0(t-N-1+10)])$$

For channel 1:

$$X_{00}=FT([x_1(t-0), x_1(t-1), x_1(t-2), \ldots x_1(t-N-1+0)])$$

$$X_{11}=FT([x_1(t-1), x_1(t-2), x_1(t-3), \ldots x_1(t-N-1+1)])$$

$$\ldots$$

$$x_{19}=FT([x_1(t-9), x_1(t-10)\, x_1(t-2), \ldots x_1(t-N-1+10)])$$

For channel 2:

$$X_{20}=FT([x_2(t-0), x_2(t-1), x_2(t-2), \ldots x_2(t-N-1+0)])$$

$$X_{21}=FT([x_2(t-1), x_2(t-2), x_2(t-3), \ldots x_2(t-N-1+1)])$$

$$\ldots$$

$$X_{29}=FT([x_2(t-9), x_2(t-10)\, x_2(t-2), \ldots x_2(t-N-1+10)])$$

For channel 3:

$$X_{30}=FT([x_3(t-0), x_3(t-1), x_3(t-2), \ldots x_3(t-N-1+0)])$$

$$X_{31}=FT([x_3(t-1), x_3(t-2), x_3(t-3), \ldots x_3(t-N-1+1)])$$

$$\ldots$$

$$X_{39}=FT([x_3(t-9), x_3(t-10)\, x_3(t-2), \ldots x_3(t-N-1+10)])$$

By way of example 10 frames may be used to construct a fractional delay. For every frame j, where j=0:9, for every frequency bin <k>, where n=0:N−1, one can construct a 1×4 vector:

$$X_{jk}=[X_{0j}(k), X_{1j}(k), X_{2j}(k), X_{3j}(k)]$$

the vector $X_{jk}$ is fed into the SBSS algorithm to find the filter coefficients $b_{jn}$. The SBSS algorithm is an independent component analysis (ICA) based on $2^{nd}$-order independence, but the mixing matrix A (e.g., a 4×4 matrix for 4-mic-array) is replaced with 4×1 mixing weight vector $b_{jk}$, which is a diagonal of $A1=A*C^1$ (i.e., $b_{jk}$=Diagonal (A1)), where $C^{-1}$ is the inverse eigenmatrix obtained from the calibration procedure described above. It is noted that the frequency domain calibration signal vectors $X'_{jk}$ may be generated as described in the preceding discussion.

The mixing matrix A may be approximated by a runtime covariance matrix Cov(j,k)=$E((X_{jk})^T*X_{jk})$, where E refers to the operation of determining the expectation value and $(X_{jk})^T$ is the transpose of the vector $X_{jk}$. The components of each vector $b_{jk}$ are the corresponding filter coefficients for each frame j and each frequency bin k, i.e., $$b_{jk}=[b_{0j}(k), b_{1j}(k), b_{2j}(k), b_{3j}(k)].$$

The independent frequency-domain components of the individual sound sources making up each vector $X_{jk}$ may be determined from:

$$S(j,k)^T = b_{jk}^{-1} \cdot X_{jk} = [(b_{0j}(k))^{-1} X_{0j}(k), (b_{1j}(k))^{-1} X_{1j}(k), (b_{2j}(k))^{-1} X_{2j}(k), (b_{3j}(k))^{-1} X_{3j}(k)]$$

where each $S(j,k)^T$ is a 1×4 vector containing the independent frequency-domain components of the original input signal x(t).

The ICA algorithm is based on "Covariance" independence, in the microphone array 102. It is assumed that there are always M+1 independent components (sound sources) and that their $2^{nd}$-order statistics are independent. In other words, the cross-correlations between the signals $x_0(t)$, $x_1(t)$, $x_2(t)$ and $x_3(t)$ should be zero. As a result, the non-diagonal elements in the covariance matrix Cov(j,k) should be zero as well.

By contrast, if one considers the problem inversely, if it is known that there are M+1 signal sources one can also determine their cross-correlation "covariance matrix", by finding a matrix A that can de-correlate the cross-correlation, i.e., the matrix A can make the covariance matrix Cov(j,k) diagonal (all non-diagonal elements equal to zero), then A is the "unmixing matrix" that holds the recipe to separate out the 4 sources.

Because solving for "unmixing matrix A" is an "inverse problem", it is actually very complicated, and there is normally no deterministic mathematical solution for A. Instead an initial guess of A is made, then for each signal vector $x_m(t)$ (m=0, 1 . . . M), A is adaptively updated in small amounts (called adaptation step size). In the case of a four-microphone array, the adaptation of A normally involves determining the inverse of a 4×4 matrix in the original ICA algorithm. Hopefully, adapted A will converge toward the true A. According to embodiments of the present invention, through the use of semi-blind-source-separation, the unmixing matrix A becomes a vector A1, since it is has already been decorrelated by the inverse eigenmatrix $C^{-1}$ which is the result of the prior calibration described above.

Multiplying the run-time covariance matrix Cov(j,k) with the pre-calibrated inverse eigenmatrix $C^{-1}$ essentially picks up the diagonal elements of A and makes them into a vector A1. Each element of A1 is the strongest-cross-correlation, the inverse of A will essentially remove this correlation. Thus, embodiments of the present invention simplify the conventional ICA adaptation procedure, in each update, the inverse of A becomes a vector inverse $b^{-1}$. It is noted that computing a matrix inverse has N-cubic complexity, while computing a vector inverse has N-linear complexity. Specifically, for the case of N=4, the matrix inverse computation requires 64 times more computation that the vector inverse computation.

Also, by cutting a (M+1)×(M+1) matrix to a (M+1)×1 vector, the adaptation becomes much more robust, because it requires much fewer parameters and has considerably less problems with numeric stability, referred to mathematically as "degree of freedom". Since SBSS reduces the number of degrees of freedom by (M+1) times, the adaptation convergence becomes faster. This is highly desirable since, in real world acoustic environment, sound sources keep changing, i.e., the unmixing matrix A changes very fast. The adaptation of A has to be fast enough to track this change and converge to its true value in real-time. If instead of SBSS one uses a conventional ICA-based BSS algorithm, it is almost impossible to build a real-time application with an array of more than two microphones. Although some simple microphone arrays that use BSS, most, if not all, use only two microphones, and no 4 microphone array truly BSS system can run in real-time on presently available computing platforms.

The frequency domain output Y(k) may be expressed as an N+1 dimensional vector $Y=[Y_0, Y_1, \ldots, Y_N]$, where each component $Y_i$ may be calculated by:

$$Y_i = [X_{i0} \quad X_{i1} \quad \cdots \quad X_{iJ}] \cdot \begin{bmatrix} b_{i0} \\ b_{i1} \\ \vdots \\ b_{iJ} \end{bmatrix}$$

Each component $Y_i$ may be normalized to achieve a unit response for the filters.

$$Y_i' = \frac{Y_i}{\sqrt{\sum_{j=0}^{J} (b_{ij})^2}}$$

Although in embodiments of the invention N and J may take on any values, it has been shown in practice that N=511 and J=9 provides a desirable level of resolution, e.g., about 1/10 of a wavelength for an array containing 16 kHz microphones.

Figure 3:
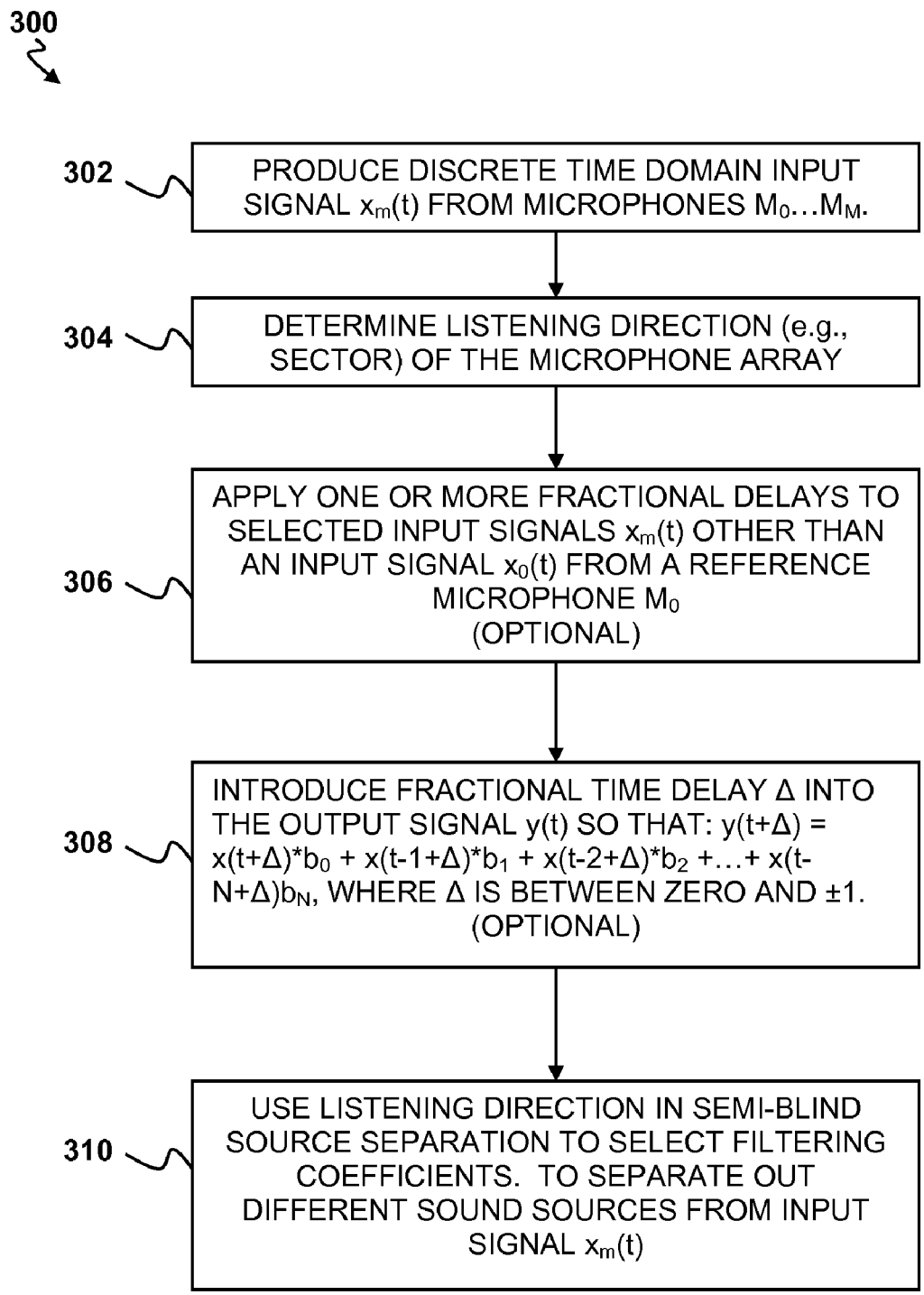
FIG. 3 is a flow diagram of a method for processing a signal from an array of two or more microphones according to an embodiment of the present invention.

Signal processing methods that utilize various combinations of the above-described concepts may be implemented in embodiments of the present invention. For example, FIG. 3 depicts a flow diagram of a signal processing method 300 that utilizes the concepts described above with respect to FIG. 2. In the method 300 a discrete time domain input signal $x_m(t)$ may be produced from microphones $M_0 \ldots M_M$ as indicated at 302. A listening direction may be determined for the microphone array as indicated at 304, e.g., by computing an inverse eigenmatrix $C^{-1}$ for a calibration covariance matrix as described above. As discussed above, the listening direction, e.g., one or more listening sectors, may be determined during calibration of the microphone array during design or manufacture or may be re-calibrated at runtime. Specifically, a signal from a source located within a defined listening sector with respect to the microphone array may be recorded for a predetermined period of time. Analysis frames of the signal may be formed at predetermined intervals and the analysis frames may be transformed into the frequency domain. A calibration covariance matrix may be estimated from a vector of the analysis frames that have been transformed into the frequency domain. An eigenmatrix C of the calibration covariance matrix may be computed and an inverse of the eigenmatrix provides the listening direction.

At 306, one or more fractional delays may optionally be applied to selected input signals $x_m(t)$ other than an input signal $x_0(t)$ from a reference microphone $M_0$. Each fractional delay is selected to optimize a signal to noise ratio of a discrete time domain output signal y(t) from the microphone array. The fractional delays are selected to such that a signal from the reference microphone $M_0$ is first in time relative to signals from the other microphone(s) of the array. At 308 a fractional time delay Δ may optionally be introduced into the output signal y(t) so that: $y(t+\Delta)=x(t+\Delta)*b_0+x(t-1+\Delta)*b_1+x(t-2+\Delta)*b_2+\ldots+x(t-N+\Delta)b_N$, where Δ is between zero and ±1. The fractional delay may be introduced as described above with respect to FIG. 2. Specifically, each time domain input signal $x_m(t)$ may be delayed by j+1 frames and the resulting delayed input signals may be transformed to a frequency domain to produce a frequency domain input signal vector $X_{jk}$ for each of k=0:N frequency bins.

At 310 the listening direction (e.g., the inverse eigenmatrix $C^{-1}$) determined at 304 is used in a semi-blind source separation to select the finite impulse response filter coefficients $b_0, b_1 \ldots b_N$ to separate out different sound sources from input signal $x_m(t)$. Specifically, filter coefficients for each microphone m, each frame j and each frequency bin k, [$b_{0j}(k)$, $b_{1j}(k), \ldots b_{Mj}(k)$] may be computed that best separate out two or more sources of sound from the input signals $x_m(t)$. Specifically, a runtime covariance matrix may be generated from each frequency domain input signal vector $X_{jk}$. The runtime covariance matrix may be multiplied by the inverse $C^{-1}$ of the eigenmatrix C to produce a mixing matrix A and a mixing vector may be obtained from a diagonal of the mixing matrix A. The values of filter coefficients may be determined from one or more components of the mixing vector.

Figure 4:
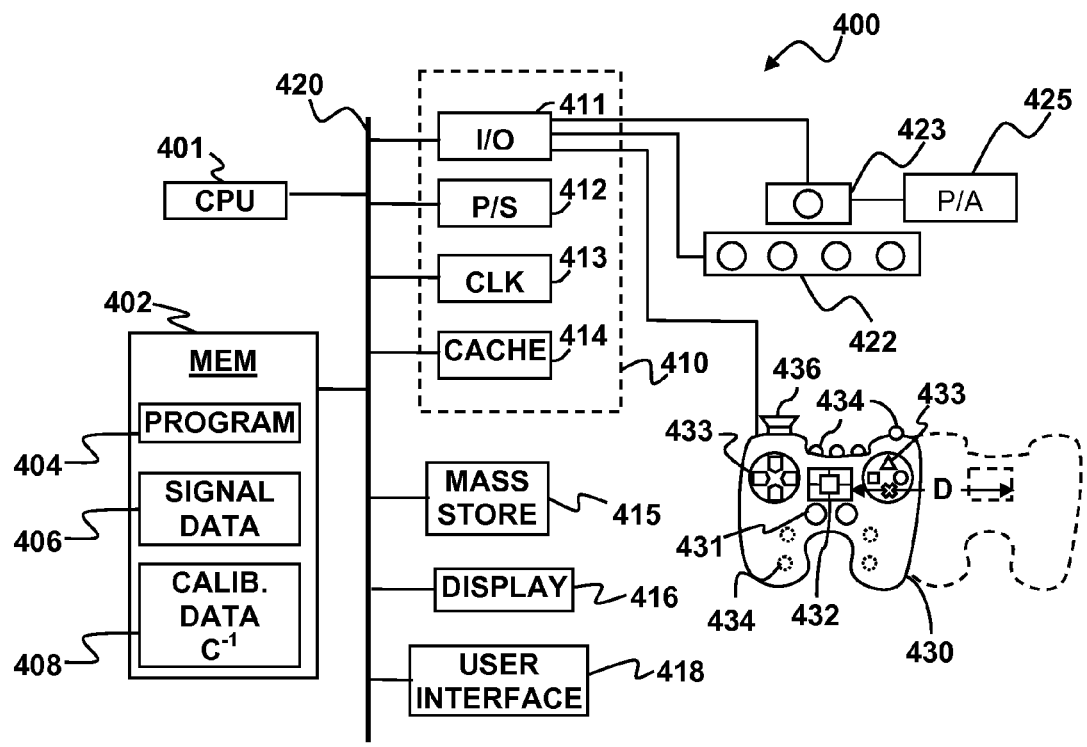
FIG. 4 is a block diagram illustrating a signal processing apparatus according to an embodiment of the present invention.

According to embodiments of the present invention, a signal processing method of the type described above with respect to FIGS. 1A-1J, 2 and 3 operating as described above may be implemented as part of a signal processing apparatus 400, as depicted in FIG. 4. The apparatus 400 may include a processor 401 and a memory 402 (e.g., RAM, DRAM, ROM, and the like). In addition, the signal processing apparatus 400 may have multiple processors 401 if parallel processing is to be implemented. The memory 402 includes data and code configured as described above. Specifically, the memory 402 may include signal data 406 which may include a digital representation of the input signals $x_m(t)$, and code and/or data implementing the filters $202_0 \ldots 202_M$ with corresponding filter taps $204_{mi}$ having delays $z^{-1}$ and finite impulse response filter coefficients $b_{mi}$ as described above. The memory 402 may also contain calibration data 408, e.g., data representing one or more inverse eigenmatrices $C^{-1}$ for one or more corresponding pre-calibrated listening zones obtained from calibration of a microphone array 422 as described above. By way of example the memory 402 may contain eignematrices for eighteen 20 degree sectors that encompass a microphone array 422.

The apparatus 400 may also include well-known support functions 410, such as input/output (I/O) elements 411, power supplies (P/S) 412, a clock (CLK) 413 and cache 414. The apparatus 400 may optionally include a mass storage device 415 such as a disk drive, CD-ROM drive, tape drive, or the like to store programs and/or data. The controller may also optionally include a display unit 416 and user interface unit 418 to facilitate interaction between the controller 400 and a user. The display unit 416 may be in the form of a cathode ray tube (CRT) or flat panel screen that displays text, numerals, graphical symbols or images. The user interface 418 may include a keyboard, mouse, joystick, light pen or other device. In addition, the user interface 418 may include a microphone, video camera or other signal transducing device to provide for direct capture of a signal to be analyzed. The processor 401, memory 402 and other components of the system 400 may exchange signals (e.g., code instructions and data) with each other via a system bus 420 as shown in FIG. 4.

The microphone array 422 may be coupled to the apparatus 400 through the I/O functions 411. The microphone array may include between about 2 and about 8 microphones, preferably about 4 microphones with neighboring microphones separated by a distance of less than about 4 centimeters, preferably between about 1 centimeter and about 2 centimeters. Preferably, the microphones in the array 422 are omni-directional microphones. An optional image capture unit 423 (e.g., a digital camera) may be coupled to the apparatus 400 through the I/O functions 411. One or more pointing actuators 425 that are mechanically coupled to the camera may exchange signals with the processor 401 via the I/O functions 411.

As used herein, the term I/O generally refers to any program, operation or device that transfers data to or from the system 400 and to or from a peripheral device. Every data transfer may be regarded as an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, such as a CD-ROM drive, CD-R drive or internal modem or other peripheral such as a flash memory reader/writer, hard drive.

In certain embodiments of the invention, the apparatus 400 may be a video game unit, which may include a game controller 430 coupled to the processor via the I/O functions 411 either through wires (e.g., a USB cable) or wirelessly. In some embodiments the game controller 430 may be mountable to a user's body. The game controller 430 may have analog joystick controls 431 and conventional buttons 433 that provide control signals commonly used during playing of video games. Such video games may be implemented as processor readable data and/or instructions which may be stored in the memory 402 or other processor readable medium such as one associated with the mass storage device 415.

The joystick controls 431 may generally be configured so that moving a control stick left or right signals movement along the X axis, and moving it forward (up) or back (down) signals movement along the Y axis. In joysticks that are configured for three-dimensional movement, twisting the stick left (counter-clockwise) or right (clockwise) may signal movement along the Z axis. These three axis—X Y and Z—are often referred to as roll, pitch, and yaw, respectively, particularly in relation to an aircraft.

The game controller 430 may include a communications interface operable to conduct digital communications with at least one of the processor 402, a game controller 430 or both. The communications interface may include a universal asynchronous receiver transmitter ("UART"). The UART may be operable to receive a control signal for controlling an operation of a tracking device, or for transmitting a signal from the tracking device for communication with another device. Alternatively, the communications interface includes a universal serial bus ("USB") controller. The USB controller may be operable to receive a control signal for controlling an operation of the tracking device, or for transmitting a signal from the tracking device for communication with another device.

In addition, the game controller 430 may include one or more inertial sensors 432, which may provide position and/or orientation information to the processor 401 via an inertial signal. Orientation information may include angular information such as a tilt, roll or yaw of the game controller 430. By way of example, the inertial sensors 432 may include any number and/or combination of accelerometers, gyroscopes or tilt sensors. In a preferred embodiment, the inertial sensors 432 include tilt sensors adapted to sense orientation of the game controller with respect to tilt and roll axes, a first accelerometer adapted to sense acceleration along a yaw axis and a second accelerometer adapted to sense angular acceleration with respect to the yaw axis. An accelerometer may be implemented, e.g., as a MEMS device including a mass mounted by one or more springs with sensors for sensing displacement of the mass relative to one or more directions. Signals from the sensors that are dependent on the displacement of the mass may be used to determine an acceleration of the game controller 430. Such techniques may be implemented by program code instructions 404 which may be stored in the memory 402 and executed by the processor 401.

By way of example an accelerometer suitable as the inertial sensor 432 may be a simple mass elastically coupled at three or four points to a frame, e.g., by springs. Pitch and roll axes lie in a plane that intersects the frame, which is mounted to the game controller 430. As the frame (and the game controller 430) rotates about pitch and roll axes the mass will displace under the influence of gravity and the springs will elongate or compress in a way that depends on the angle of pitch and/or roll. The displacement and of the mass can be sensed and converted to a signal that is dependent on the amount of pitch and/or roll. Angular acceleration about the yaw axis or linear acceleration along the yaw axis may also produce characteristic patterns of compression and/or elongation of the springs or motion of the mass that can be sensed and converted to signals that are dependent on the amount of angular or linear acceleration. Such an accelerometer device can measure tilt, roll angular acceleration about the yaw axis and linear acceleration along the yaw axis by tracking movement of the mass or compression and expansion forces of the springs. There are a number of different ways to track the position of the mass and/or or the forces exerted on it, including resistive strain gauge material, photonic sensors, magnetic sensors, hall-effect devices, piezoelectric devices, capacitive sensors, and the like.

In addition, the game controller 430 may include one or more light sources 434, such as light emitting diodes (LEDs). The light sources 434 may be used to distinguish one controller from the other. For example one or more LEDs can accomplish this by flashing or holding an LED pattern code. By way of example, 5 LEDs can be provided on the game controller 430 in a linear or two-dimensional pattern. Although a linear array of LEDs is preferred, the LEDs may alternatively, be arranged in a rectangular pattern or an arcuate pattern to facilitate determination of an image plane of the LED array when analyzing an image of the LED pattern obtained by the image capture unit 423. Furthermore, the LED pattern codes may also be used to determine the positioning of the game controller 430 during game play. For instance, the LEDs can assist in identifying tilt, yaw and roll of the controllers. This detection pattern can assist in providing a better user/feel in games, such as aircraft flying games, etc. The image capture unit 423 may capture images containing the game controller 430 and light sources 434. Analysis of such images can determine the location and/or orientation of the game controller. Such analysis may be implemented by program code instructions 404 stored in the memory 402 and executed by the processor 401. To facilitate capture of images of the light sources 434 by the image capture unit 423, the light sources 434 may be placed on two or more different sides of the game controller 430, e.g., on the front and on the back (as shown in phantom). Such placement allows the image capture unit 423 to obtain images of the light sources 434 for different orientations of the game controller 430 depending on how the game controller 430 is held by a user.

In addition the light sources 434 may provide telemetry signals to the processor 401, e.g., in pulse code, amplitude modulation or frequency modulation format. Such telemetry signals may indicate which joystick buttons are being pressed and/or how hard such buttons are being pressed. Telemetry signals may be encoded into the optical signal, e.g., by pulse coding, pulse width modulation, frequency modulation or light intensity (amplitude) modulation. The processor 401 may decode the telemetry signal from the optical signal and execute a game command in response to the decoded telemetry signal. Telemetry signals may be decoded from analysis of images of the game controller 430 obtained by the image capture unit 423. Alternatively, the apparatus 401 may include a separate optical sensor dedicated to receiving telemetry signals from the lights sources 434. The use of LEDs in conjunction with determining an intensity amount in interfacing with a computer program is described, e.g., in commonly-assigned U.S. patent application No. 11/429,414, to Richard L. Marks et al., entitled "USE OF COMPUTER IMAGE AND AUDIO PROCESSING IN DETERMINING AN INTENSITY AMOUNT WHEN INTERFACING WITH A COMPUTER PROGRAM", which is incorporated herein by reference in its entirety. In addition, analysis of images containing the light sources 434 may be used for both telemetry and determining the position and/or orientation of the game controller 430. Such techniques may be implemented by program code instructions 404 which may be stored in the memory 402 and executed by the processor 401.

The processor 401 may use the inertial signals from the inertial sensor 432 in conjunction with optical signals from light sources 434 detected by the image capture unit 423 and/or sound source location and characterization information from acoustic signals detected by the microphone array 422 to deduce information on the location and/or orientation of the game controller 430 and/or its user. For example, "acoustic radar" sound source location and characterization may be used in conjunction with the microphone array 422 to track a moving voice while motion of the game controller is independently tracked (through the inertial sensor 432 and or light sources 434). Any number of different combinations of different modes of providing control signals to the processor 401 may be used in conjunction with embodiments of the present invention. Such techniques may be implemented by program code instructions 404 which may be stored in the memory 402 and executed by the processor 401.

Signals from the inertial sensor 432 may provide part of a tracking information input and signals generated from the image capture unit 423 from tracking the one or more light sources 434 may provide another part of the tracking information input. By way of example, and without limitation, such "mixed mode" signals may be used in a football type video game in which a Quarterback pitches the ball to the right after a head fake head movement to the left. Specifically, a game player holding the controller 430 may turn his head to the left and make a sound while making a pitch movement swinging the controller out to the right like it was the football. The microphone array 420 in conjunction with "acoustic radar" program code can track the user's voice. The image capture unit 423 can track the motion of the user's head or track other commands that do not require sound or use of the controller. The sensor 432 may track the motion of the game controller (representing the football). The image capture unit 423 may also track the light sources 434 on the controller 430. The user may release of the "ball" upon reaching a certain amount and/or direction of acceleration of the game controller 430 or upon a key command triggered by pressing a button on the game controller 430.

In certain embodiments of the present invention, an inertial signal, e.g., from an accelerometer or gyroscope may be used to determine a location of the game controller 430. Specifically, an acceleration signal from an accelerometer may be integrated once with respect to time to determine a change in velocity and the velocity may be integrated with respect to time to determine a change in position. If values of the initial position and velocity at some time are known then the absolute position may be determined using these values and the changes in velocity and position. Although position determination using an inertial sensor may be made more quickly than using the image capture unit 423 and light sources 434 the inertial sensor 432 may be subject to a type of error known as "drift" in which errors that accumulate over time can lead to a discrepancy D between the position of the joystick 430 calculated from the inertial signal (shown in phantom) and the actual position of the game controller 430. Embodiments of the present invention allow a number of ways to deal with such errors.

For example, the drift may be cancelled out manually by re-setting the initial position of the game controller 430 to be equal to the current calculated position. A user may use one or more of the buttons on the game controller 430 to trigger a command to re-set the initial position. Alternatively, image-based drift may be implemented by re-setting the current position to a position determined from an image obtained from the image capture unit 423 as a reference. Such image-based drift compensation may be implemented manually, e.g., when the user triggers one or more of the buttons on the game controller 430. Alternatively, image-based drift compensation may be implemented automatically, e.g., at regular intervals of time or in response to game play. Such techniques may be implemented by program code instructions 404 which may be stored in the memory 402 and executed by the processor 401.

In certain embodiments it may be desirable to compensate for spurious data in the inertial sensor signal. For example the signal from the inertial sensor 432 may be oversampled and a sliding average may be computed from the oversampled signal to remove spurious data from the inertial sensor signal. In some situations it may be desirable to oversample the signal and reject a high and/or low value from some subset of data points and compute the sliding average from the remaining data points. Furthermore, other data sampling and manipulation techniques may be used to adjust the signal from the inertial sensor to remove or reduce the significance of spurious data. The choice of technique may depend on the nature of the signal, computations to be performed with the signal, the nature of game play or some combination of two or more of these. Such techniques may be implemented by program code instructions 404 which may be stored in the memory 402 and executed by the processor 401.

The processor 401 may perform digital signal processing on signal data 406 as described above in response to the data 406 and program code instructions of a program 404 stored and retrieved by the memory 402 and executed by the processor module 401. Code portions of the program 404 may conform to any one of a number of different programming languages such as Assembly, C++, JAVA or a number of other languages. The processor module 401 forms a general-purpose computer that becomes a specific purpose computer when executing programs such as the program code 404. Although the program code 404 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 404 may include a set of processor readable instructions that implement a method having features in common with the method 110 of FIG. 1B, the method 120 of FIG. 1D, the method 140 of FIG. 1F, the method 300 of FIG. 3 or some combination of two or more of these. The program code 404 may generally include one or more instructions that direct the one or more processors to select a pre-calibrated listening zone at runtime and filter out sounds originating from sources outside the pre-calibrated listening zone. The pre-calibrated listening zones may include a listening zone that corresponds to a volume of focus or field of view of the image capture unit 423.

The program code may include one or more instructions which, when executed, cause the apparatus 400 to select a pre-calibrated listening sector that contains a source of sound. Such instructions may cause the apparatus to determine whether a source of sound lies within an initial sector or on a particular side of the initial sector. If the source of sound does not lie within the default sector, the instructions may, when executed, select a different sector on the particular side of the default sector. The different sector may be characterized by an attenuation of the input signals that is closest to an optimum value. These instructions may, when executed, calculate an attenuation of input signals from the microphone array 422 and the attenuation to an optimum value. The instructions may, when executed, cause the apparatus 400 to determine a value of an attenuation of the input signals for one or more sectors and select a sector for which the attenuation is closest to an optimum value.

The program code 404 may optionally include one or more instructions that direct the one or more processors to produce a discrete time domain input signal $x_m(t)$ from the microphones $M_0 \ldots M_M$, determine a listening sector, and use the listening sector in a semi-blind source separation to select the finite impulse response filter coefficients to separate out different sound sources from input signal $x_m(t)$. The program 404 may also include instructions to apply one or more fractional delays to selected input signals $x_m(t)$ other than an input signal $x_0(t)$ from a reference microphone $M_0$. Each fractional delay may be selected to optimize a signal to noise ratio of a discrete time domain output signal y(t) from the microphone array. The fractional delays may be selected to such that a signal from the reference microphone $M_0$ is first in time relative to signals from the other microphone(s) of the array. The program 404 may also include instructions to introduce a fractional time delay A into an output signal y(t) of the microphone array so that: $y(t+\Delta)=x(t+\Delta)*b_0+x(t-+\Delta)*b_1+x(t-2+\Delta)*b_2+ \ldots +x(t-N+\Delta)_b N$, where A is between zero and ±1.

The program code 404 may optionally include processor executable instructions including one or more instructions which, when executed cause the image capture unit 423 to monitor a field of view in front of the image capture unit 423, identify one or more of the light sources 434 within the field of view, detect a change in light emitted from the light source(s) 434; and in response to detecting the change, triggering an input command to the processor 401. The use of LEDs in conjunction with an image capture device to trigger actions in a game controller is described e.g., in commonly-assigned, U.S. patent application Ser. No. 10/759,782 to Richard L. Marks, filed Jan. 16, 2004 and entitled: METHOD AND APPARATUS FOR LIGHT INPUT DEVICE, which is incorporated herein by reference in its entirety.

The program code 404 may optionally include processor executable instructions including one or more instructions which, when executed, use signals from the inertial sensor and signals generated from the image capture unit from tracking the one or more light sources as inputs to a game system, e.g., as described above. The program code 404 may optionally include processor executable instructions including one or more instructions which, when executed compensate for drift in the inertial sensor 432.

In addition, the program code 404 may optionally include processor executable instructions including one or more instructions which, when executed adjust the gearing and mapping of controller manipulations to game a environment. Such a feature allows a user to change the "gearing" of manipulations of the game controller 430 to game state. For example, a 45 degree rotation of the game controller 430 may be geared to a 45 degree rotation of a game object. However this 1:1 gearing ratio may be modified so that an X degree rotation (or tilt or yaw or "manipulation") of the controller translates to a Y rotation (or tilt or yaw or "manipulation") of the game object. Gearing may be 1:1 ratio, 1:2 ratio, 1:X ratio or X:Y ratio, where X and Y can take on arbitrary values. Additionally, mapping of input channel to game control may also be modified over time or instantly. Modifications may comprise changing gesture trajectory models, modifying the location, scale, threshold of gestures, etc. Such mapping may be programmed, random, tiered, staggered, etc., to provide a user with a dynamic range of manipulatives. Modification of the mapping, gearing or ratios can be adjusted by the program code 404 according to game play, game state, through a user modifier button (key pad, etc.) located on the game controller 430, or broadly in response to the input channel. The input channel may include, but may not be limited to elements of user audio, audio generated by controller, tracking audio generated by the controller, controller button state, video camera output, controller telemetry data, including accelerometer data, tilt, yaw, roll, position, acceleration and any other data from sensors capable of tracking a user or the user manipulation of an object.

In certain embodiments the program code 404 may change the mapping or gearing over time from one scheme or ratio to another scheme, respectively, in a predetermined time-dependent manner. Gearing and mapping changes can be applied to a game environment in various ways. In one example, a video game character may be controlled under one gearing scheme when the character is healthy and as the character's health deteriorates the system may gear the controller commands so the user is forced to exacerbate the movements of the controller to gesture commands to the character. A video game character who becomes disoriented may force a change of mapping of the input channel as users, for example, may be required to adjust input to regain control of the character under a new mapping. Mapping schemes that modify the translation of the input channel to game commands may also change during gameplay. This translation may occur in various ways in response to game state or in response to modifier commands issued under one or more elements of the input channel. Gearing and mapping may also be configured to influence the configuration and/or processing of one or more elements of the input channel.

In addition, a sound emitter 436, e.g., a speaker, a buzzer, a horn or a pipe, may be mounted to the game controller 430. In certain embodiments the sound emitter may be detachably mounted to a "body" of the game controller 430. In "acoustic radar" embodiments wherein the program code 404 locates and characterizes sounds detected with the microphone array 422, the sound emitter 436 may provide an audio signal that can be detected by the microphone array 422 and used by the program code 404 to track the position of the game controller 430. The sound emitter 436 may also be used to provide an additional "input channel" from the game controller 430 to the processor 401. Audio signals from the sound emitter 436 may be periodically pulsed to provide a beacon for the acoustic radar to track location. The audio signals (pulsed or otherwise) may be audible or ultrasonic. The acoustic radar may track the user manipulation of the game controller 430 and where such manipulation tracking may include information about the position and orientation (e.g., pitch, roll or yaw angle) of the game controller 430. The pulses may be triggered at an appropriate duty cycle as one skilled in the art is capable of applying. Pulses may be initiated based on a control signal arbitrated from the system. The apparatus 400 (through the program code 404) may coordinate the dispatch of control signals amongst two or more game controllers 430 coupled to the processor 401 to assure that multiple controllers can be tracked.

Figure 5:
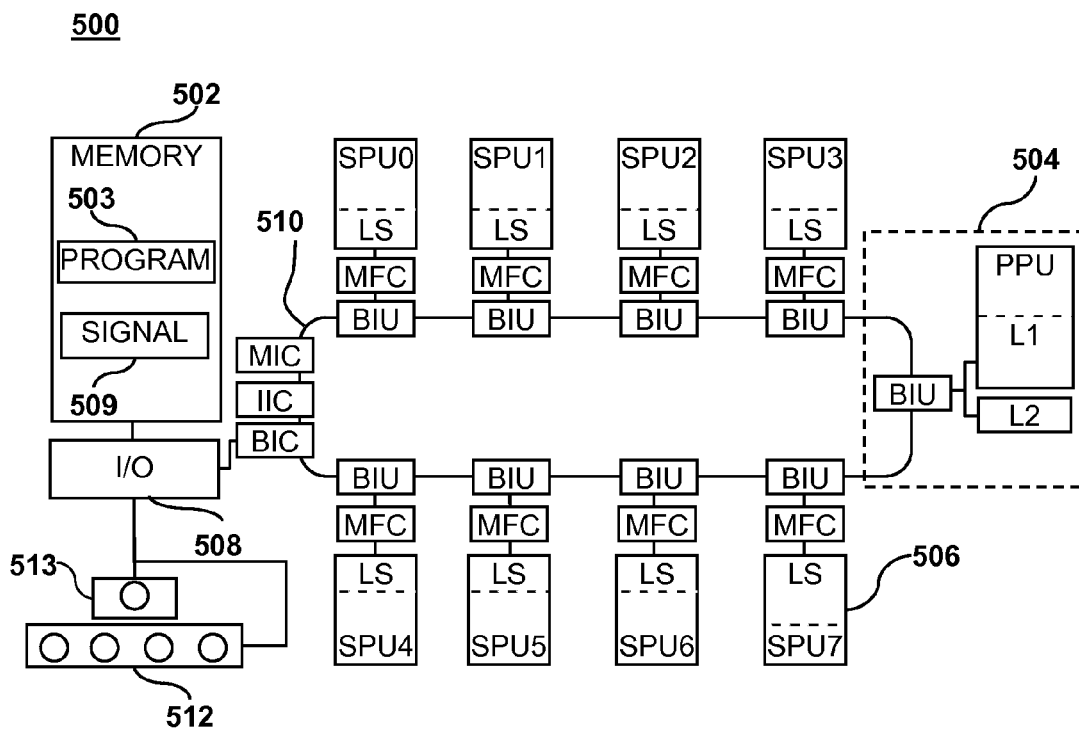
FIG. 5 is a block diagram of a cell processor implementation of a signal processing system according to an embodiment of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 5 illustrates a type of cell processor 500 according to an embodiment of the present invention. The cell processor 500 may be used as the processor 401 of FIG. 4. In the example depicted in FIG. 5, the cell processor 500 includes a main memory 502, power processor element (PPE) 504, and a number of synergistic processor elements (SPEs) 506. In the example depicted in FIG. 5, the cell processor 500 includes a single PPE 504 and eight SPE 506. In such a configuration, seven of the SPE 506 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 5.

The main memory 502 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a signal processing program 503 and a signal 509 may be resident in main memory 502. The signal processing program 503 may be configured as described with respect to FIGS. 1B, 1D, 1F or 3 above or some combination of two or more of these. The signal processing program 503 may run on the PPE. The program 503 may be divided up into multiple signal processing tasks that can be executed on the SPEs and/or PPE.

By way of example, the PPE 504 may be a 64-bit PowerPC Processor Unit (PPU) with associated caches L1 and L2. The PPE 504 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 504 is the management and allocation of tasks for the SPEs 506 in the cell processor 500.

Although only a single PPE is shown in FIG. 5, some cell processor implementations, such as cell broadband engine architecture (CBEA), the cell processor 500 may have multiple PPEs organized into PPE groups, of which there may be more than one. These PPE groups may share access to the main memory 502. Furthermore the cell processor 500 may include two or more groups SPEs. The SPE groups may also share access to the main memory 502. Such configurations are within the scope of the present invention.

Each SPE 506 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in a system 500 may be performed by issuing direct memory access (DMA) commands from the memory flow controller (MFC) to transfer data to or from the local storage domain (of the individual SPE). The SPUs are less complex computational units than the PPE 504 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 504 allow for cost-effective processing over a wide range of applications.

Each SPE 506 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 506 and/or between the SPEs 506 and the PPE 504, the SPEs 506 and PPE 504 may include signal notification registers that are tied to signaling events. The PPE 504 and SPEs 506 may be coupled by a star topology in which the PPE 504 acts as a router to transmit messages to the SPEs 506. Alternatively, each SPE 506 and the PPE 504 may have a one-way signal notification register referred to as a mailbox. The mailbox can be used by an SPE 506 to host operating system (OS) synchronization.

The cell processor 500 may include an input/output (I/O) function 508 through which the cell processor 500 may interface with peripheral devices, such as a microphone array 512 and optional image capture unit 513. In addition an Element Interconnect Bus 510 may connect the various components listed above. Each SPE and the PPE can access the bus 510 through a bus interface units BIU. The cell processor 500 may also includes two controllers typically found in a processor: a Memory Interface Controller MIC that controls the flow of data between the bus 510 and the main memory 502, and a Bus Interface Controller BIC, which controls the flow of data between the I/O 508 and the bus 510. Although the requirements for the MIC, BIC, BIUs and bus 510 may vary widely for different implementations, those of skill in the art will be familiar their functions and circuits for implementing them.

The cell processor 500 may also include an internal interrupt controller IIC. The IIC component manages the priority of the interrupts presented to the PPE. The IIC allows interrupts from the other components the cell processor 500 to be handled without using a main system interrupt controller. The IIC may be regarded as a second level controller. The main system interrupt controller may handle interrupts originating external to the cell processor.

In embodiments of the present invention, certain computations, such as the fractional delays described above, may be performed in parallel using the PPE 504 and/or one or more of the SPE 506. Each fractional delay calculation may be run as one or more separate tasks that different SPE 506 may take as they become available.

Embodiments of the present invention may utilize arrays of between about 2 and about 8 microphones in an array characterized by a microphone spacing d between about 0.5 cm and about 2 cm. The microphones may have a dynamic range from about 120 Hz to about 16 kHz. It is noted that the introduction of fractional delays in the output signal y(t) as described above allows for much greater resolution in the source separation than would otherwise be possible with a digital processor limited to applying discrete integer time delays to the output signal. It is the introduction of such fractional time delays that allows embodiments of the present invention to achieve high resolution with such small microphone spacing and relatively inexpensive microphones. Embodiments of the invention may also be applied to ultrasonic position tracking by adding an ultrasonic emitter to the microphone array and tracking objects locations through analysis of the time delay of arrival of echoes of ultrasonic pulses from the emitter.

Although for the sake of example the drawings depict linear arrays of microphones embodiments of the invention are not limited to such configurations. Alternatively, three or more microphones may be arranged in a two-dimensional array, or four or more microphones may be arranged in a three-dimensional array. In one particular embodiment, a system based on 2-microphone array may be incorporated into a controller unit for a video game.

Signal processing systems of the present invention may use microphone arrays that are small enough to be utilized in portable hand-held devices such as cell phones personal digital assistants, video/digital cameras, and the like. In certain embodiments of the present invention increasing the number of microphones in the array has no beneficial effect and in some cases fewer microphones may work better than more. Specifically a four-microphone array has been observed to work better than an eight-microphone array.

Embodiments of the present invention may be used as presented herein or in combination with other user input mechanisms and notwithstanding mechanisms that track or profile the angular direction or volume of sound and/or mechanisms that track the position of the object actively or passively, mechanisms using machine vision, combinations thereof and where the object tracked may include ancillary controls or buttons that manipulate feedback to the system and where such feedback may include but is not limited light emission from light sources, sound distortion means, or other suitable transmitters and modulators as well as controls, buttons, pressure pad, etc. that may influence the transmission or modulation of the same, encode state, and/or transmit commands from or to a device, including devices that are tracked by the system and whether such devices are part of, interacting with or influencing a system used in connection with embodiments of the present invention.

Although embodiments of the present invention have been shown to operate with an entertainment console and controller such as in a video game unit it must be understood that other embodiments of the present invention clearly may be operable in a variety of uses, industries, apart from gaming and entertainment.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A tracking device for use in obtaining information for controlling an execution of a game program by a processor for enabling an interactive game to be played by a user, comprising:
    a movable body;
    a sound emitter operable to emit a sound attached to the body; and
    a processor operable to execute the game program for enabling the interactive game to be played by the user, the apparatus further comprising an acoustic transducer, wherein the acoustic transducer includes a microphone array having two or more microphones, each microphone being coupled to a plurality of filters, the filters being configured to filter input signals corresponding to sounds detected by the microphones thereby generating a filtered output, wherein the processor is configured to:
    pre-calibrate plurality of sets of filter parameters for the plurality of filters to determine a corresponding plurality of pre-calibrated listening zones, wherein each set of filter parameters is selected to detect portions of the input signals corresponding to sounds originating within a given listening zone and filter out sounds originating outside the given listening zone; and
    select a particular pre-calibrated listening zone at a runtime by applying to the plurality of filters sets of filter parameters corresponding to two or more different pre-calibrated listening zones;
    determine a value of an attenuation of the input signals for the two or more different pre-calibrated listening zones;
    select a particular zone of the two or more different pre-calibrated listening zones for which the attenuation is closest to an optimum value; and
    apply the filter parameters for the particular zone to the plurality of filters;
    wherein the processor is operable to register input to the game program based on acoustic information produced by the acoustic transducer in response to a sound emitted by the sound emitter.

2. The tracking device as claimed in claim 1, wherein the sound emitter includes at least one of a speaker, a buzzer, a horn or a pipe.

3. The apparatus as claimed in claim 1, wherein the processor is operable to register the input when the acoustic information satisfies a predetermined criterion.

4. The apparatus as claimed in claim 3, wherein the sound emitter is operable to emit a sound specific to a particular user associated with the tracking device and the processor is operable to register input specific to the particular user when the specific sound is emitted.

5. The apparatus as claimed in claim 3 or 4, wherein the predetermined criterion includes at least one criterion selected from the group consisting of pitch, audio pulse frequency, audio pulse shape, audio pulse duty cycle, beat frequency, or spectral signature including a spectral content characteristic of a distinctive sound.

6. The tracking device as claimed in claim 1, further comprising a communications interface operable to conduct digital communications with at least one of the processor, a game controller or both the processor and the game controller.

7. The tracking device as claimed in claim 6, wherein the communications interface includes a universal asynchronous receiver transmitter ("UART").

8. The tracking device as claimed in claim 7, wherein the UART is operable to perform at least one of receiving a control signal for controlling an operation of the tracking device, or for transmitting a signal from the tracking device for communication with another device.

9. The tracking device as claimed in claim 6 or 7, wherein the communications interface includes a universal serial bus ("USB") controller.

10. The tracking device as claimed in claim 9, wherein the USB controller is operable to perform at least one of receiving a control signal for controlling an operation of the tracking device, or for transmitting a signal from the tracking device for communication with another device.

11. The tracking device as claimed in claim 1, wherein the body is mountable to a game controller, the game controller including a game controller body and at least one input device assembled with the game controller body, the input device manipulable by a user to register an input from the user.

12. An apparatus including the tracking device and the game controller as claimed in claim 6.

13. The tracking device as claimed in claim 1, wherein the body of the tracking device is mountable to the user's body.

* * * * *